United States Patent [19]
Belser

[11] Patent Number: 6,081,397
[45] Date of Patent: Jun. 27, 2000

[54] METHOD AND APPARATUS FOR SID-TO-SID PERIOD ESTIMATION

[75] Inventor: Karl Arnold Belser, San Jose, Calif.

[73] Assignee: International Business Machines Corporation, Armonk, N.Y.

[21] Appl. No.: 08/833,637

[22] Filed: Apr. 8, 1997

[51] Int. Cl.$^7$ ............................... G11B 5/09; G11B 5/596
[52] U.S. Cl. .......................... 360/51; 360/47; 360/77.08; 360/714
[58] Field of Search ........................... 360/49, 51, 77.08, 360/78.14

[56] References Cited

U.S. PATENT DOCUMENTS

| | | | |
|---|---|---|---|
| 5,255,131 | 10/1993 | Coker et al. | 360/48 |
| 5,307,216 | 4/1994 | Cook et al. | 360/72.1 |
| 5,706,265 | 1/1998 | Bang | 369/50 |
| 5,768,234 | 6/1998 | Satomura | 369/50 |
| 5,825,568 | 10/1998 | Lee | 360/51 |

FOREIGN PATENT DOCUMENTS

| | | | |
|---|---|---|---|
| 0 660 307 A2 | 12/1994 | European Pat. Off. | G11B 5/55 |
| 58-051825 | 3/1983 | Japan | G11B 21/10 |
| 60-043874 | 3/1985 | Japan | G11B 5/012 |
| 2-155181 | 6/1990 | Japan | G11B 21/10 |

Primary Examiner—Aristotelis M. Psitos
Assistant Examiner—Regina Y. Neal
Attorney, Agent, or Firm—Gray Cary Ware Freidenrich

[57] ABSTRACT

A method and apparatus for locating more accurately the beginning of data cells stored on a medium with embedded servo sectors and improving the efficiency with which data can be stored on a medium as a consequence of more accurately locating the beginning of data cells stored on the medium. A counter counts the number of cycles of a clock. Initially, the counter is reset to zero upon recognition of a valid servo identification pattern (SID). When a terminal count value representative of the elapse of time until the end of a servo sector is reached, the counter is loaded with a negative value and continues to count. Upon detecting the next SID, the value of the counter should be equal to zero if an estimated time between detection of the last SID and the current SID was equal to the actual time between detection of the two SIDs. If the value of the counter is positive, then the current SID arrived under the head later than expected. In response, the value that is to be loaded into the counter upon the counter reaching terminal count is decremented. If the value of the counter is negative, then the current SID was early. Accordingly, the value to be loaded into the counter after terminal count is reached is incremented. Incrementing or decrementing the value to be loaded into the counter corrects for errors in the rotational velocity of the medium.

52 Claims, 13 Drawing Sheets

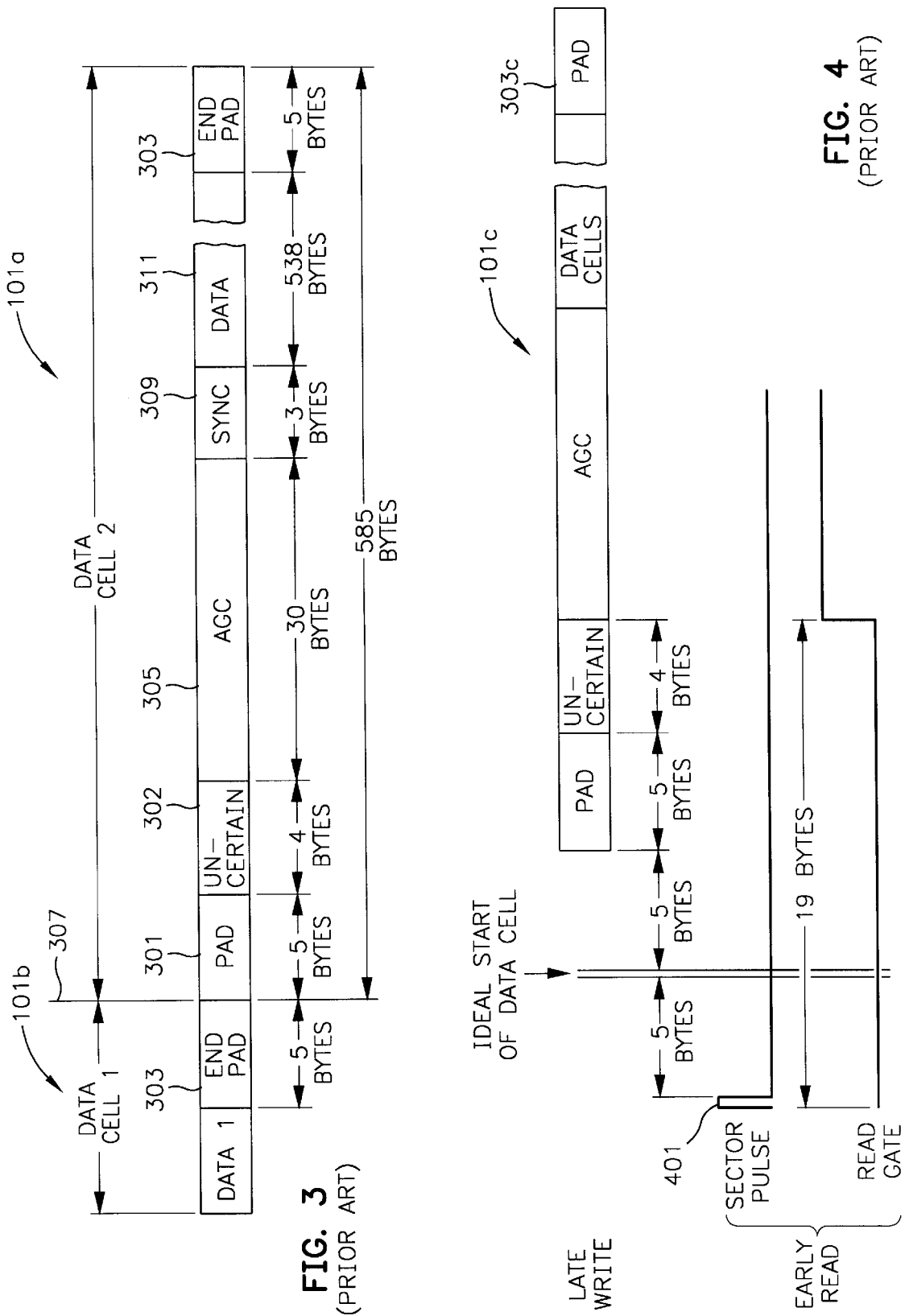

METHOD AND APPARATUS FOR SID-TO-SID PERIOD ESTIMATION

BACKGROUND OF THE INVENTION

1. Field of the Invention

The present invention relates generally to direct access storage devices, and more particularly to a method and apparatus for detecting changes in the rotational velocity of a rotating data storage medium and compensating for such changes.

2. Description of the Related Art

Direct Access Storage Devices (DASDs) which use a rotating disk having a magnetically sensitive coating are well known. The magnetic coating can be magnetically biased to indicate at least two distinct logical states during a write procedure. These distinct logical states can then be read at a later time during a read procedure in order to recover digital information that was stored during the write operation.

FIG. 1 is an illustration of the manner in which data is organized on a medium in accordance with one particular type of direct access storage device (DASD), commonly referred to as an embedded servo disk drive. In accordance with the DASD shown in FIG. 1, data is organized in data cells 101 stored within tracks 102 on a storage medium 103. The data is read and written by a read/write head which is suspended over the media that rotates about a central axis through the center 104 of the medium 103 and perpendicular to the plane of the medium 103. Each track 102 comprises of all the information stored on the medium 103 at a particular radial distance from the center 104 of the medium 103. Tracks 102 can be identified either by the radial distance of the track from the center of the medium, or by a track number which may be assigned sequentially to each track 102 starting at the track furthest from the center of the medium according to methods known in the art of disk drive design.

FIG. 2 illustrates how data is typically organized within a servo sector 107 in the case of a DASD in which data is encoded in a format suitable for detection using well-known partial response maximum-likelihood (PRML) data channels. Each servo sector 107 includes, for example, an Automatic Gain Control (AGC) field 203, a Sector Identification (SID) field 205, a Gray code (GC) field, or track ID 207, and a Position Error Signal (PES) field 209. A pattern provided in the AGC field 203 allows the gain and frequency of the data channel to be adjusted to compensate for differences in the amplitude and frequency of the data and servo information detected by the read/write head and to synchronize the servo/data detection channel. The information provided in the SID field 205 indicates the circumferential position of the particular sector over which the read/write head is suspended. That is, the SID field 205 encodes an index position with one encoding and a plurality of other non-index positions with other encodings. The circumferential position is determined by counting the number of non-index positions starting from the index SID. The information provided in the GC field 207 encodes a track identifier for a track over which the read/write head is suspended, and in some multiple disk drive implementations, a head identifier. The information provided in the PES field 209 is used to determine an analog error between the desired track center and the actual read/write head position. Accordingly, the information provided in the PES field 209 is used by the servo portion of the channel to keep the head centered on the track. U.S. Pat. No. 5,285,327 provides information related to a servo sector architecture and is incorporated herein by reference. In some DASDs, each time the read/write head passes over the servo sector 107, as indicated by detection of a SID pattern, a SID pulse is generated. The SID pulse is used to synchronize a System Clock that runs at a high frequency with respect to the rate at which SID pulses occur. The number of cycles of the System Clock that occur between SID pulses is counted by a System Clock counter. At predetermined counts of the System Clock counter, a sector pulse is generated. Each sector pulse indicates where a data cell should begin. The sector pulse is used as a timing indicator from which write gate and read gate timings are referenced. The write gate is used to enable the read/write head to write data to the medium. Similarly, the read gate is used to enable the read/write head to read data from the medium. There may be one or more sector pulses between servo sectors. The locations of each of the data regions following each servo sector will generally differ. Hence, the SID count is used to control a look-up of data cell locations from a data cell location memory.

The circumferential position of the read/write head with respect to the medium is synchronized at the beginning of each sector by the detection of the SID. Accordingly, the locations of the beginning of the data cells that follow are determined to a relatively high degree of accuracy. However, if one SID is not detected due, for example, to a read error, the position of the read/write head is not synchronized to the medium at the start of the next sector and changes in the rotational velocity are not taken into account in determining the beginning of the data cells of that next sector. Consequently, the risk arises that the write gate may be activated at the wrong time, causing data or servo information to be unintentionally overwritten.

To prevent such unintentional overwriting, a pad may be provided at the beginning and end of each data cell. The pad compensates for the uncertainty as to the relationship between the time the sector pulse is generated and the time the read/write head is actually located over the beginning of a data cell. Specifically, variations in the rotational velocity of the medium can cause a sector pulse to occur either early or late with respect to the beginning of an associated data cell. Therefore, if the sector pulse occurs early (i.e., before the beginning of the data cell) and each data cell ends just before the next data cell begins, data which is intended to be written at the beginning of the data cell will unintentionally overwrite the information recorded at the end of the previous data cell.

FIG. 3 is an illustration of the organization of a data cell 101 as commonly provided in DASDs using PRML data channels. Pads 301, 303 are provided at the beginning and end of each data cell 101. In addition, the AGC field 305 is made long enough to ensure that if the sector pulse occurs late with respect to the beginning of a data cell 307, the read head will still be able to read enough of the AGC pattern from the AGC field 305 to allow the AGC circuit 28 to properly adjust the gain and frequency of the channel. A synchronization pattern 309 at the end of the AGC field 305 provides framing information about the upcoming data to the channel. It also indicates that the read/write head is at the end of the AGC field 305 and that a data field 311 is about to begin. Since the read/write head requires a period of time after being provided a write signal before valid data can be written with certainty, a 4 byte field 302 in which the magnetic state of the flux on the medium is uncertain precedes the AGC field 305. In the data cell 101 shown in FIG. 3, the AGC field 305 is 30 bytes long, and has a synchronization pattern 309 of 3 bytes appended at the end. Assuming that the AGC circuit 28 that reads and writes to this data cell requires a minimum of 10bytes of AGC information in order to properly set the gain of the channel, the sector pulse may be as much as 5 bytes early or late without causing a read or write error. However, there are two worst case situations which must be considered.

The first situation is illustrated in FIG. 4, in which data was written to a first data cell 101c in response to a sector pulse (not shown) which occurred 5 bytes after the ideal start of the data cell. Thus, the pad 301 and each subsequent field of the data cell 101c was written 5 bytes late (i.e., is shifted 5 bytes to the right with respect to the ideal start of the data cell as shown in FIG. 4). It should be understood that because each field of the data cell 101c is written during every write operation, the entire data cell 101c is shifted when a write operation starts late. This shift must be taken into account to ensure that the 4 byte field 302 in which the magnetic state of the flux on the medium is uncertain is not read and mistaken for a valid AGC pattern in a subsequent attempt to read the data cell 101c. Such a mistake could result in the gain or timing synchronization being improperly set. Improperly setting the gain or timing synchronization can cause errors in the decoding of the data in a PRML decoding channel. Such a shift is accounted for by ensuring that the read gate is generated no less than 19 bytes after the sector pulse. By waiting at least 19 bytes after the sector pulse 401 before activating the read gate, the read/write head will always be over a valid AGC pattern, even in the worst case situation shown in FIG. 4.

The second situation is illustrated in FIG. 5, in which data was written to a first data cell 101d in response to a sector pulse (not shown) which occurred 5 bytes before the ideal start of the data cell. Thus, the pad 301d and each subsequent field of the data cell 101 c was written 5 bytes early (i.e., is shifted 5 bytes to the left with respect to the ideal start of the data cell as shown in FIG. 5). If the sector pulse 501 associated with a subsequent read operation occurs 5 bytes late (i.e., 10 bytes after the beginning of the pad 301d), the read gate will be generated 29 bytes after the beginning of the pad 301d. Therefore, the read gate will be generated 20 bytes after the beginning of the AGC field 305. Accordingly, in order to ensure that at least 10 bytes of the AGC field 305 will be read after the read gate is generated, the AGC field 305 must be at least 30 bytes long.

Inefficiencies in the manner in which the data must be formatted on the medium can account for a loss to the user of more than 25% of the otherwise useable data storage area. Due to the relatively large capacity of current data storage devices, even small increases of the efficiency can make relatively large blocks of additional capacity available to the user. In the highly competitive market for data storage devices, such improvements in the efficiency of a data storage device can result in improved sales and greater market share.

One source of inefficiency in the storage of information within a track of a DASD, is the use of pads between each data cell. It should be clear that if the start of a data cell can be determined more accurately, the pads can be made smaller. Furthermore, since the location of each data cell is determined with respect to the location of the SID, the more accurately the position of each SID can be estimated upon a failure to detect the actual SID, the more accurately the start of each data cell can be determined, and consequently, the smaller the pad in each data cell can be made. Furthermore, as can be seen from the above description of the timing of the read and write gates, the more accurately the location of the servo sectors can be identified, the shorter the AGC field 305 can be made.

Accordingly, it is an object of the present invention to provide a system and method for more accurately determining the beginning of a data cell in the presence of media velocity variations. Another object of the present invention is to provide a system and method for improving the efficiency with which data can be stored on a medium. Still another object of the present invention is to provide a system and method for reducing the size of the pads and AGC fields of data cells stored on a medium.

SUMMARY OF THE INVENTION

The present invention is a method and apparatus for locating more accurately the beginnings of data cells stored on a medium with embedded servo sectors. The present invention also improves the efficiency with which data can be stored on a medium as a consequence of more accurately locating the beginning of data cells stored on the medium.

In accordance with the preferred embodiment of the present invention, a clock is provided which preferably runs at a constant frequency that is substantially higher than the rate at which the servo sectors are expected to pass under a read/write head. A first counter is also provided to count the number of cycles of the clock between servo identification patterns (SIDs). The first counter is reset to zero upon recognition of a valid SID. When a terminal count value is reached the counter is loaded with a negative value. The terminal count value is preferably a positive value that corresponds in time to the expected end of the recorded information in the servo sector (which coincides with the start of a data cell). The negative value is preferably adjusted to anticipate the amount of time which should elapse between the end of the servo sector and detection of a SID in the next servo sector. The adjustment is based upon the amount of time which elapsed between the end of the next to last servo sector and the detection of the SID in the last servo sector. Accordingly, the sum of the absolute values of the positive and negative count values anticipates the amount of time expected to elapse between detection of the last SID and detection of the next SID. The negative value is preferably stored in a second counter that is incremented or decremented by control conditions derived from the first counter values upon detection of each SID.

Immediately after power has been applied in the DASD, the first counter is reset to zero and the second counter is loaded with a nominal negative value corresponding to the estimated nominal time between the end of the servo sector and detection of the next SIDs. In steady state operation, if the estimated nominal time is equal to the actual time, then the value of the first counter is reset to zero and the negative value stored in the second counter remains unchanged when the current SID is detected. However, if the value of the counter is non-zero and positive when the current SID is detected, then the current SID arrived under the head later than expected (i.e., the medium is rotating slower than expected). In response, the first counter is reset to zero, but the negative value in the second counter is decremented (i.e., made more negative). Preferably, the value is decremented by one count. However, in an alternative embodiment, the value is decremented by a constant factor less than I times the error. Alternatively, if the value of the first counter is non-zero and negative, then the current SID was early (i.e., the medium is rotating faster than expected). Accordingly, the first counter is reset to zero, but the negative value in the second counter is incremented (i.e., made less negative).

Preferably, the value is incremented by one count. However, in an alternative embodiment, the value is incremented by a constant factor less than 1 times the error. Incrementing or decrementing the value in the second counter corrects for errors in the rotational velocity of the medium. Thus, as the medium speeds up or slows down due to forces applied to the medium, the SID location in time can be accurately estimated so that even if the SID is not detected, the point in time when the read/write head should detect a SID may be accurately estimated. The point in time when that SID should have occurred can be estimated with sufficient accuracy to determine the relative location of the data cells that follow with a relatively high degree of accuracy. A sector pulse is generated to signal the start of a data cell when the count in the first counter equals a specific data cell count value obtained from a table for the given rotational position. The data cell count values can be further corrected to account for the fact that the negative value that is loaded into the first counter changes to accommodate the changes in medium speed. The correction is made by multiplying the nominal data cell count value by the current value in the second counter and dividing it by the nominal value that was loaded into the second counter when power was turned on.

In addition, the present invention provides a means by which the relative location of the read/write head can be determined when the particular head that is coupled to the data channel changes. That is, in a DASD in which several platters are provided, each platter is associated with a unique read/write head. Each read/write head is typically mechanically coupled to each other read/write head. The relative location at any particular point in time of a first read/write head with respect to the servo sectors read by that first head may, in some DASDs, differ by a known amount from the relative positions of the servo sectors read by each other head. Accordingly, a servo sector on a first platter is read by the associated first read/write head at a first time, a servo sector on a second platter is read by the associated second read/write head at a second time which occurs some time after the first time, etc. Only one read/write head is coupled to the data channel at a time.

In order to more easily determine approximately when a second read/write head is over a servo sector immediately after switching from a first read/write head to the second read/write head, the present invention adjusts the count value that was previously used to estimate when the SID of the first read/write head should be detected. This adjusted count value can then be used to estimate when the SID of the second read/write head should be detected. In accordance with one embodiment of the present invention, the count value is adjusted by adding or subtracting an offset value to the count value. The offset value is determined based upon the relative positions of the servo sectors that are read by the first and second read/write heads.

In accordance with one embodiment of the present invention, the gain of the read/write heads can vary significantly from one head to another within the same DASD. Therefore, in order to ensure that the AGC data will not either saturate the gain control circuit or be read at such a low level that no signal is detected, a table of the gain of each head may be maintained. As each head is coupled to the data channel, the gain is approximately set for that head. The gain will then be more accurately adjusted in a conventional manner in response to the data read from AGC fields stored on the medium in accordance with the data format being used.

BRIEF DESCRIPTION OF THE DRAWING

The details of the present invention, both as to its structure and operation, can best be understood in reference to the accompanying drawings, in which like reference numerals refer to like parts, and in which:

FIG. 3 is an illustration of the organization of a data cell in a DASD using PRML data encoding;

FIG. 4 is an illustration of the relationship between a data cell that was written late and subsequently read with an early sector pulse;

DETAILED DESCRIPTION OF THE PREFERRED EMBODIMENTS

The present invention is a method and apparatus for determining the locations of the beginnings of data cells on a data storage medium within a direct access storage device (DASD), such as a magnetic disk drive. By using the present invention, the beginning of each data cell can be more accurately determined after a "failure" of a servo identification pattern (SID) (i.e., after a servo decoder has failed to detect a SID within a servo field). In addition, the present invention shows how to correct the count from the previous SID or estimated SID location to the desired sector pulse that identifies the start of a data cell when the velocity of the disk has changed. More particularly, the present invention estimates the "SID-to-SID period" in order to decrease the data sector format overhead required to allow read and write operations after failure of a SID. The SID-to-SID period is defined as the amount of time required for the medium to rotate from a first position in which the servo decoder has detected a first SID from a first servo sector, to a second position in which the servo decoder has detected a second SID from a second servo sector adjacent to the first servo sector. The decreased overhead can result in greater than a 4% increase in disk capacity and will make data recovery procedures faster by more precise control of timing.

Figure 6A:
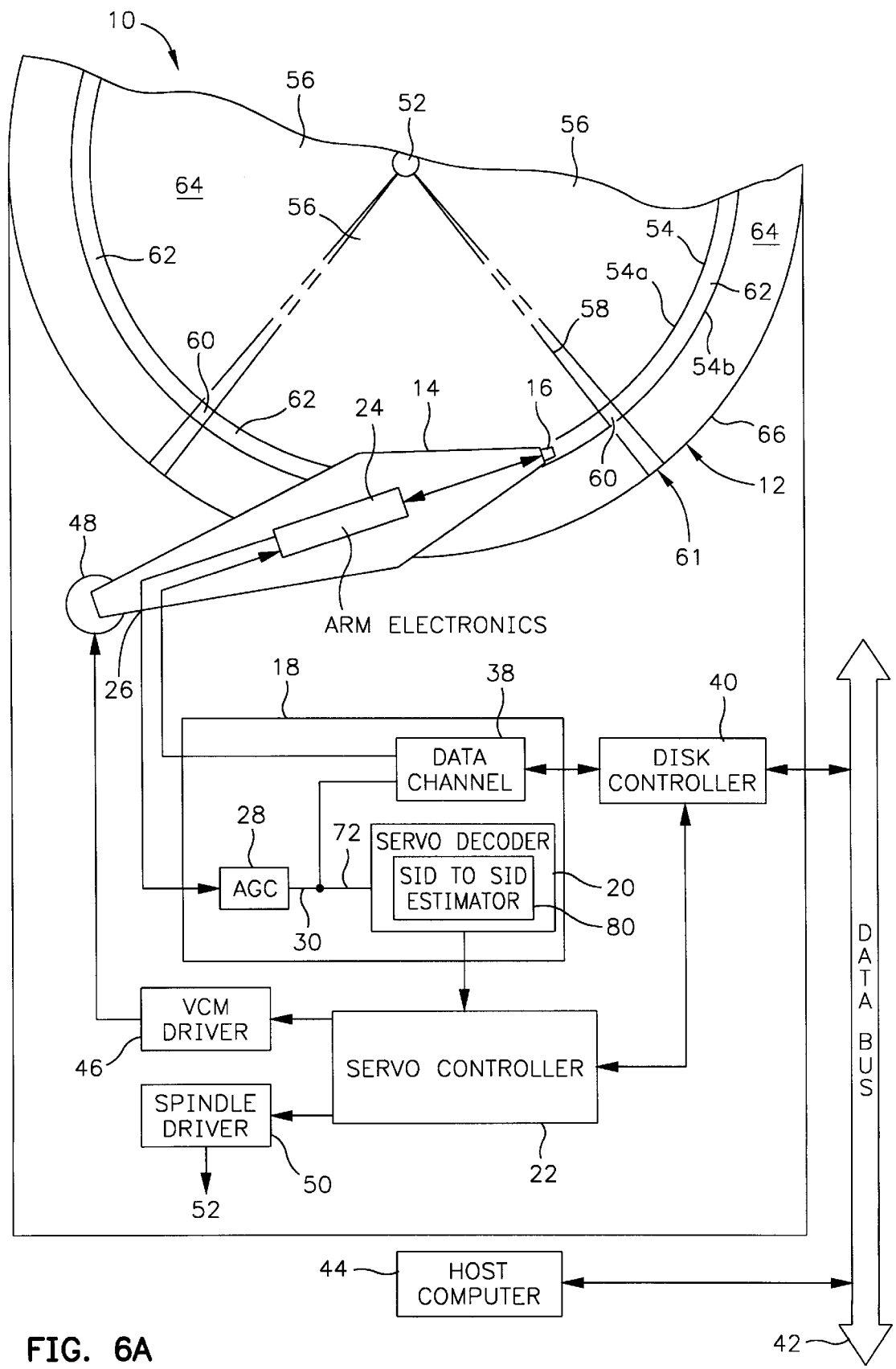
FIG. 6A is an illustration of a particular direct access storage device (DASD) in accordance with the present invention.

FIG. 6A is an illustration of a particular direct access storage device (DASD) in accordance with the present invention. In particular, the DASD of FIG. 6A is a sector servo magnetic disk drive 10 constructed in accordance with the present invention. However, it should be understood that the present invention may be used in any DASD in which the storage medium is divided by servo sectors having a SID. Accordingly, it should be understood that the DASD shown in FIG. 6A is shown merely for illustrative purposes.

The disk drive of FIG. 6A includes a disk 12 that is rotated and a disk arm 14 that is moved radially across the disk 12. It should be noted that while only one disk is shown in FIG. 6A, such disk drives typically have more than one disk. Each disk is essentially identical. The disks are stacked one on top of another and are mechanically coupled together so that each disk rotates at the same rotational velocity. Information is typically read from or recorded to one disk 12 at a time as a sequence of flux transitions imparted by an essentially conventional read/write head 16. Typically, one read/write head 16 is associated with each disk 12. A channel chip 18 contains essentially conventional read control circuitry for the detection and decoding of the readback signal from each head 16. The chip 18 also contains essentially conventional write control circuitry for the encoding and modulation of the write current from or to each head 16. In addition, the chip 18 preferably detects servo sector fine tracking, track number, and servo sector number information that corresponds to the disk track over which the head 16 is actually located. The servo decoder 20 provides the track identification number to a servo controller 22 in a conventional manner. In response, the servo controller 22 controls movement of the disk arm 14. In accordance with the present invention, the servo decoder 20 includes a SID-to-SID Estimator 80 which provides sector pulses to the data channel 38, as will be described in greater detail below. The data channel 38 then generates read and/or write gates which control the reading and writing of data to the medium based upon the timing of the servo pulses provided by the servo decoder 20.

A readback signal produced by the read/write head 16 is provided to arm electronics ("AE") 24 mounted on the servo arm 14. The AE performs two functions. First, the AE provides a fast, high current write pulse for driving the recording head when data is being written. Second, the AE amplifies the readback signal from the head and provides the amplified signal over a pre-amplifier output line 26 to the channel chip 18. In the channel chip, the signal is preferably received at an automatic gain control (AGC) circuit 28 that adjusts the gain applied to the servo signal to maintain the signal amplitude within a range that is predetermined to simplify information processing, reduce noise, and improve system linearity. The amplified signal from the AGC circuit 28 is provided over an AGC output line 30 to the data channel circuit 38 and the servo decoder 20.

The data channel circuit 38 processes the signal provided by the AGC to reproduce user data recorded on the disk 12 and provides such data to a disk controller 40. In one embodiment of the present invention, the data channel 38 includes a signal equalizer for preconditioning the analog data signal and a data separator for converting the equalized data signal into ones and zeros synchronous to a channel clock signal. From the disk controller 40, the user data is provided to a data bus 42, where the data is received by a host computer processor 44. The servo decoder 20 receives the output from the AGC circuit 28, produces the disk track and servo sector identification numbers, generates sector pulses, provides the track and sector numbers to the servo controller 22, and provides the sector pulses to the data channel 38. The servo controller 22 uses the servo sector identification number to control the timing of the data channel in conventional fashion, uses the track identification number to move the head to a desired track in a track seek operation and, if provided, uses the PES to maintain the head centered over a track in a track following operation. The data channel uses the sector pulses to generate the read and/or write gates.

In accordance with the present invention, cycles of a clock, referred to hereafter as the "System Clock", are counted beginning when a first SID is detected. The number of cycles is compared to a predetermined value that represents the number of cycles that occur between a first and second adjacent SID when the medium is rotating at a nominal rotational velocity. If the number of cycles counted between the first and second SID is greater than the predetermined number, then the predetermined number is adjusted upward upon detection of the second SID. If, on the other hand, the number of cycles counted between the first and second SID is less than the predetermined number, then the predetermined number is adjusted downward upon detection of the second SID. In either case, the count is newly started upon detection of the second SID. Sector pulses are generated at particular count values. The particular count values are a function of the number of data cells per sector, the location of the beginning of the first data cell with respect to the preceding SID, and the number of cycles of the System Clock that were counted between the last two SIDs.

Figure 6B:
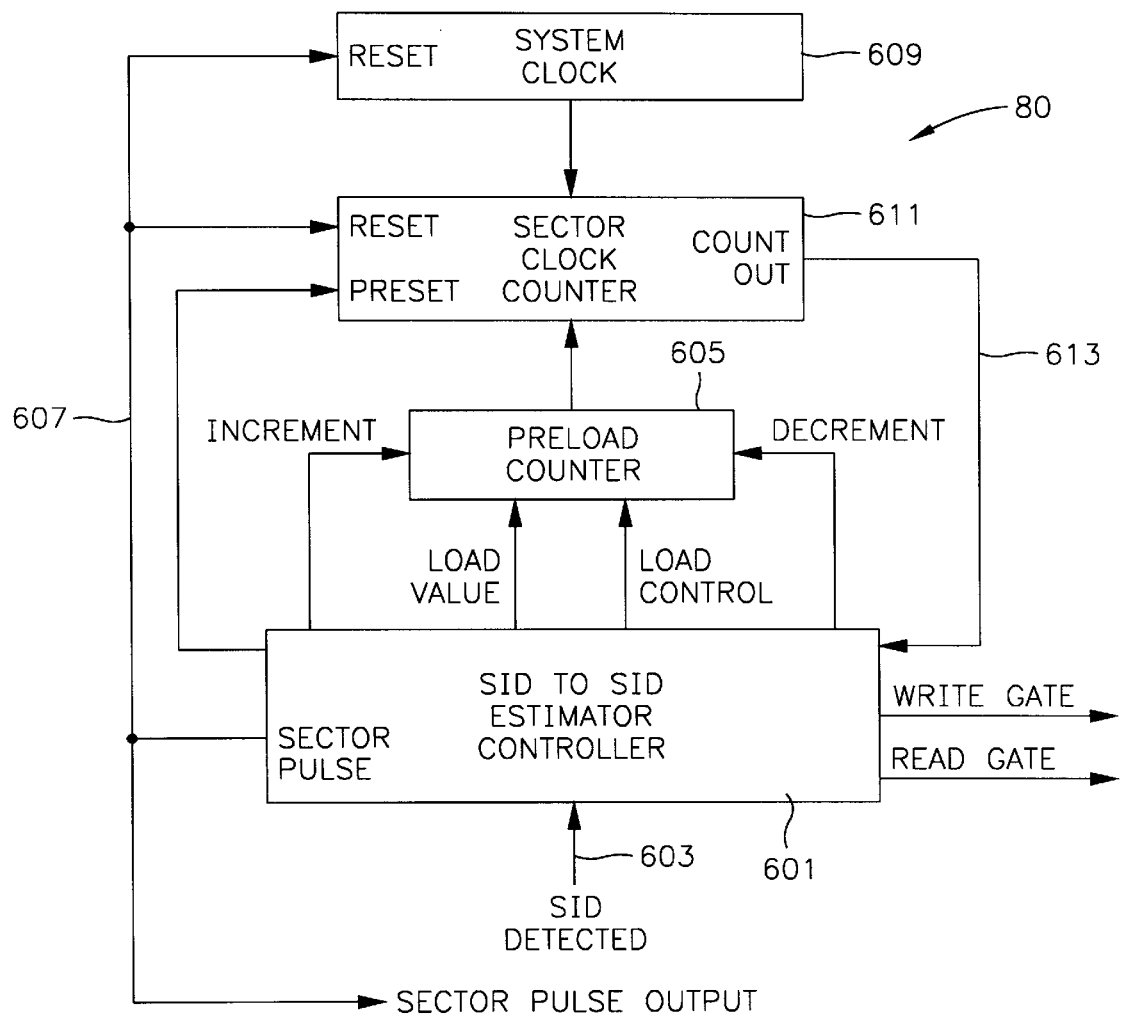
FIG. 6B is a simplified block diagram of the SID-to-SID Estimator used to determine when a SID pattern is expected to be detected and to generate sector pulses at predetermined times with respect to a SID pulse.
Figure 6C:
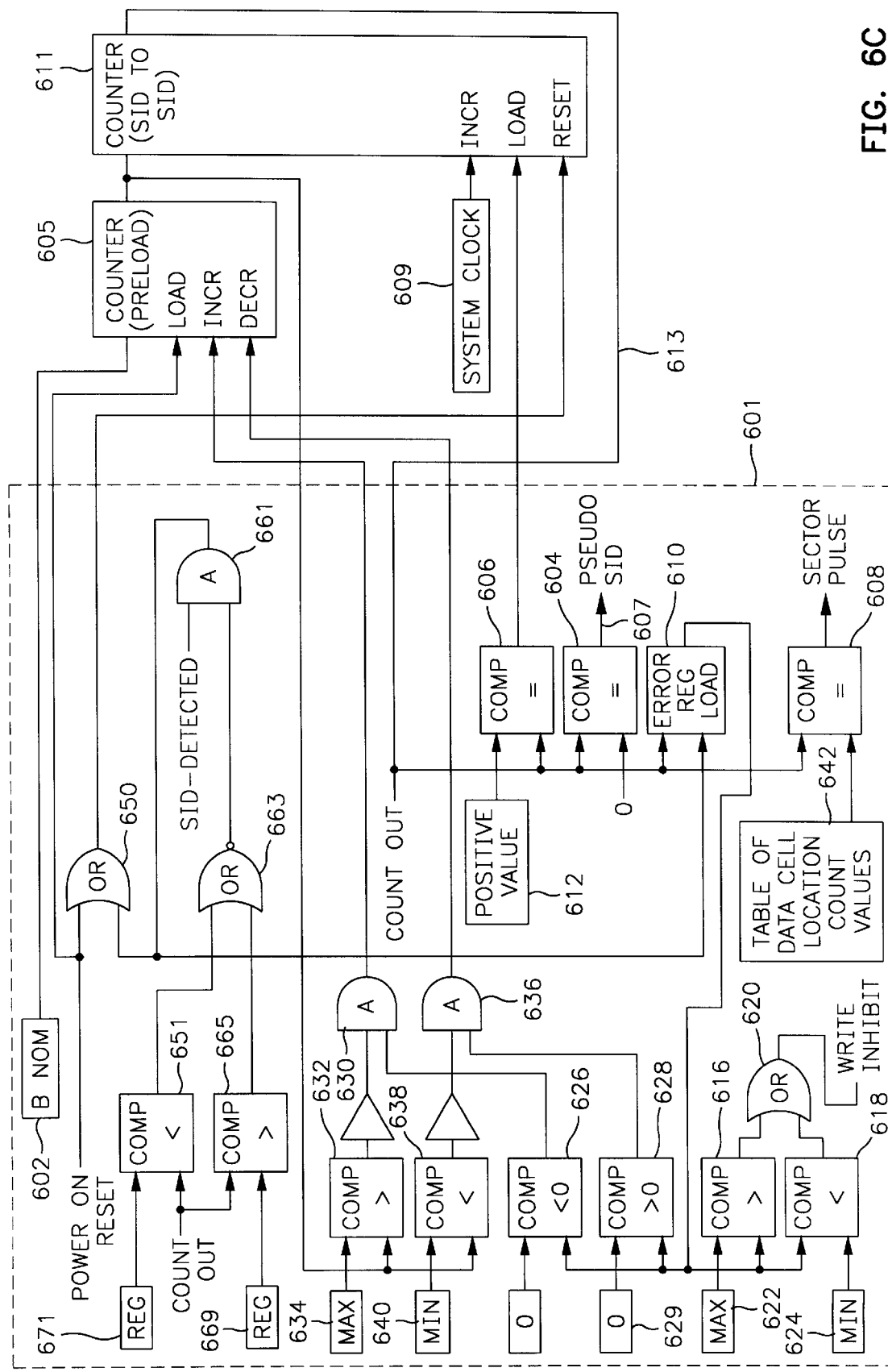
FIG. 6C is a more detailed block diagram of the SID-to-SID Estimator of the present invention.

FIG. 6B is a simplified block diagram of one embodiment of a SID-to-SID Estimator 80 used to determine when a SID pattern is expected to be detected and to generate sector pulses at predetermined times with respect to a SID pulse. In accordance with one embodiment of the present invention, a SID-to-SID Estimator Controller (SEC) 601 generates a "window" during which the read/write head is expected to detect a SID pattern. FIG. 6C is a more detailed block diagram of the SID-to-SID Estimator of the present invention. When power is first applied to a DASD using the present invention, the SEC 601 generates a power-on reset signal. The power-on reset signal is coupled to a System Clock counter 611 through a logical OR gate 650. The power-on reset signal causes a value stored within a Preload register 602 to be loaded into a Preload counter 605. In addition, the power on reset signal preferably causes the System Clock counter 611 to be loaded with a predetermined value, which is preferably zero. A second input to the OR gate 650 is coupled to the circuitry tasked with recognizing the SID. Therefore, upon detection of the first SID the System Clock counter 611 is reloaded with the same value as was loaded after power was initially been applied (e.g., preferably zero).

The value stored within the Preload register 602 is preferably equal to the number of System Clock pulses that occur between end of the servo sector and detection of the next SID when the media is rotating at a nominal velocity. This value may, for example, be stored in the Preload register 602 when the SEC 601 is manufactured, read from a system track and stored in the Preload register 602 during a boot-up routine, determined dynamically during a calibration routine by averaging a plurality of SID to SID times, or read from an initialization program stored in a read-only-memory within the DASD, for example. Other means for initializing the Preload counter 605 may be used, such as reading the value directly from the system track into the Preload counter 605, etc. It will be clear to those skilled in the art that there are many other ways to initialize the value of the Preload counter 605 with a known value.

When a SID is detected, a System Clock 609 may be synchronized to the SID pulse and starts a new cycle, and the System Clock counter 611 is preferably reset to zero. Alternatively, the System Clock 609 need not be synchronized by the SID pulse, since the frequency of the System Clock 609 is preferably fast enough to make an error of less than one cycle of the System Clock negligible. In accordance with one embodiment of the present invention, the System Clock 609 runs at a frequency of 14,080 cycles per SID-to-SID period when the medium is rotating at a nominal rotational velocity (7600 RPM in accordance with one embodiment). In another embodiment of the present invention, the System Clock 609 runs at a frequency that is a power of 2, such as 16,384, for reasons that are discussed in detail below. It should be understood that the particular frequency of the System Clock 609 is selected to minimize interference with other signals on which the clock frequency is likely to be inductively or otherwise coupled. In addition, the frequency is selected to be great enough to provide an appropriate resolution in estimating the timing of the next SID. With these considerations in mind, the System Clock 609 may run at any appropriate frequency.

The System Clock counter 611 is coupled via a count value output signal line 613 to a Pseudo SID comparator 604, a Load comparator 606, a Sector Pulse comparator 608, and an Error register 610 within the SEC 601. Therefore, concurrent with the loading of the Preload counter 605, and as a consequence of the resetting of the System Clock counter 611, the SEC 601 outputs a Pseudo SID pulse on a Pseudo SID signal line 607. More particularly, the Pseudo SID pulse is generated by a Pseudo SID comparator 604 which compares the value of the System Clock counter 611 with value loaded upon detection of a SID (e.g. preferably zero).

From this point forward, it is assumed that the System Clock counter 611 is reset to zero upon either power-on reset or detection of a SID. However, it should be understood that the System Clock counter 611 may be loaded with a predetermined value rather than reset to zero, and that the Pseudo SID comparator 604 would then compare the output of the System Clock counter 611 to that predetermined value rather than to zero in order to generate the Pseudo SID pulse.

Once reset, the System Clock counter 611 preferably begins counting up toward a positive terminal count value, which is preferably stored in a Terminal Count Register 612 within the SEC 601. It should be understood that the System Clock counter 611 could alternatively count down toward a negative terminal count value. In accordance with the preferred embodiment, the terminal count value is equal to the number of cycles of the System Clock 609 that occur between detection of a SID and the end of the servo sector 107 when the medium is rotating at the nominal rotational velocity.

When the terminal count value is reached, as preferably determined by the Load comparator 606, the SEC 601 loads the System Clock counter 611 with the value previously stored within the Preload counter 605. In accordance with the preferred embodiment of the present invention, the predetermined value is preferably negative and equal to:

$$B = -C_{SS} + A + 1 \quad (1)$$

where:

$C_{SS}$ is the nominal SID-to-SID count (i.e., the number of cycles of the System Clock 609 which occur between the each sector when the medium is rotating at the nominal rotational velocity), and A is the terminal count value.

In accordance with one embodiment of the present invention, the terminal count value A is equal to 480 and $C_{SS}$ is 14,080. Accordingly, the predetermined value B is equal to $-14,080+480+1=-13,599$. Therefore, if the medium is rotating at the nominal rotational velocity, and the value $-13599$ is loaded into the counter 611, and the counter is counting upward, then the counter value will be exactly equal to zero when the next SID is detected. As a result, a pulse will be generated on the Pseudo SID signal by comparator 607 at the same time the actual SID pulse is detected. Alternatively, an up and down counter may be used and can count down from a positive B value.

The Sector Pulse comparator 608 has a first input which is coupled to the output from the System Clock counter 611. A second input to the Sector Pulse comparator 608 is coupled to a table 642 which includes data cell location count values. Each data cell location count value indicates the location of the beginning of a data cell with respect to the SID which precedes that data cell. The value represents the number of cycles of the System Clock 609, offset from the value stored in the Preload register 602. This will become clear upon further description of the operation of the present invention provided below. The Sector Pulse comparator 608 outputs sector pulses to the data channel to allow the data channel to generate write gate and read gate signals based upon the location of the beginning of each data cell.

Each time a SID is detected, the Error register 610 is loaded with the count value from the System Clock counter 611, after which the System Clock counter 611 is preferably reset to zero. The output from the Error register 610 is coupled to two comparators 626, 628 within the SEC 601. In accordance with the preferred embodiment of the present invention, the comparator 626 determines whether the new value of the Error Register 610 is negative. The comparator 628 determines whether the new value of the Error Register 610 is positive. In accordance with one embodiment of the present invention, the value zero is hard wired to one set of inputs to the comparators 626 and 628.

If the value of the Error register 610 is less than the reset value, then the output from the Increment comparator 626 is asserted. The output from the Increment comparator 626 being asserted indicates that the value stored in the Preload counter 605 was too low (e.g., in the case of a reset value of zero, the Preload counter 605 was too negative). The output from the Increment comparator 626 is coupled to a two input logical AND gate 630. The second input to the AND gate 630 is coupled to a comparator 632. Inputs to the comparator 632 are coupled to the output of the Preload counter 605 and to a Max Preload register 634 which stores a predetermined Maximum Preload Register value. As long as the absolute value of the contents of the Preload counter 605 is not less than the predetermined Maximum Preload Register value stored in the Max Preload register 634, the output from the Increment comparator 626 will cause the Preload counter 605 to increment (e.g., when the reset value is zero, the increment comparator 626 causes the Preload counter 605 to become less negative). Therefore, asserting the Increment comparator 626 will cause the value of the Preload counter 605 to become less negative in response to a SID being detected early (i.e., when the System Clock counter 611 value does not reach zero before the next SID is detected) as long as the value of the Preload counter 605 is not already too near zero.

In the preferred embodiment of the present invention, if the value of the Error register 610 is positive, then the output from the Decrement comparator 628 is asserted. The output from the Decrement comparator 628 being asserted indicates that the value stored in the Preload counter 605 was not negative enough (i.e., the absolute value stored is too small). The output from the Decrement comparator 628 is coupled to a two input logical AND gate 636. The second input to the AND gate 636 is coupled to a comparator 638. Inputs to the comparator 638 are coupled to the output of the Preload counter 605 and to a Min Preload register 640 which stores a predetermined Minimum Preload Register value. As long as the absolute value of the contents of the Preload counter 605 is not greater than the predetermined Minimum Preload Register value stored in the Min Preload register 640, the output from the Decrement comparator 628 will cause the Preload counter 605 to decrement (i.e., become more negative). Therefore, asserting the Decrement comparator 628 will cause the value of the Preload counter 605 to become more negative in response to a SID being detected early (i.e., when the System Clock counter 611 value does not reach zero before the next SID is detected) as long as the value of the Preload counter 605 is not already too negative. Accordingly, the value of the Preload counter 605 will be decremented to adjust for the fact that the rotation of the media has slowed.

In an alternative embodiment of the present invention, a value other than zero may be loaded into the System Clock counter 611, in which case, a System Clock (SC) Counter Value register 629 maintains the value that is to be loaded into the System Clock counter 611 each time a SID is detected. In such a case, the SC Counter Value register 629 is coupled to each of the comparators 626, 628.

In accordance with the preferred embodiment of the present invention, the SEC 601 asserts a "Write Inhibit" signal to inhibit the data channel from writing to the medium when the absolute value of the error (i.e., the value of the System Clock counter 611 at the time a SID is detected) is greater than a predetermined value. The Write Inhibit signal is preferably generated by two comparators 616 and 618, a logical OR gate 620, and two registers 622, 624. The first such comparator 616 asserts an output signal if the value of the Error register 610 is greater than a maximum value maintained in a Max Value register 622. The second comparator 618 asserts an output signal if the count value of the Error register 610 is less than a minimum value maintained in a Min Value register 624. The output signals from the comparators are each coupled to an input of the OR gate 620. Accordingly, if the value of the Error register 610 is outside the range of values bounded by the maximum and minimum values stored in the registers 622, 624 coupled to the comparators 616, 618, then the output from the OR gate 620 (i.e., the Write Inhibit signal) will be asserted. The write inhibit signal is coupled to the data channel to prevent the data channel from writing to the medium.

In addition, in accordance with one embodiment of the present invention shown in FIG. 6C, a logical AND gate 661 prevents SID detection if the output from the System Clock counter 611 is not within a predetermined range of zero. By enabling the SID to reset the System Clock counter 611 only during a predefined range, incorrect detection by the SID detection circuitry of a SID pattern, such as those patterns present in the gray code region of each track or which might occur during a user data field within a data cell, will not cause inappropriate read or write gates to be generated by the data channel. The second input to the gate 661 is coupled to the output from a two input logical OR gate 663. Each input to the NOR gate 663 is coupled to one of two comparators 665, 667. The comparators 665 asserts an output signal if the counter 611 has a value that is greater than a predetermined maximum value stored in a Max Count register 669. Likewise, the comparator 667 asserts an output signal if the counter 611 is below a predetermined value stored within a Min Count register 671. Accordingly, if the counter 611 has a value that is not within a "window", the output from the NOR gate 663 will be asserted (i.e., logical low) and so the AND gate will prevent the SID detect signal from resetting the counter 611. It should be apparent that this function may be implemented in a number of alternative ways.

In accordance with one embodiment of the present invention used in a DASD having more than one read/write head, when the particular read/write head coupled to the data channel 38 changes, the next SID pattern read by the new read/write head cannot be expected to be detected when the counter 611 reaches zero. That is, while each read/write head is typically aligned to each other read/write head, the servo sectors on each surface over which the read/write heads pass are typically not aligned. This skewing of servo sectors is intentional for performance reasons. If there are N heads and associated platters, each head being associated with a number from n=0 to n=N−1, and the nominal SID-to-SID count being $C_{SS}$, then there will be a count of $C_{nn}$ between detection of servo sectors by adjacent heads (i.e., heads associated with adjacent platters), where:

$$C_{nn} = C_{SS}/N \qquad (2)$$

if the servo sectors 107 on each platter are evenly staggered.

Figure 6D:
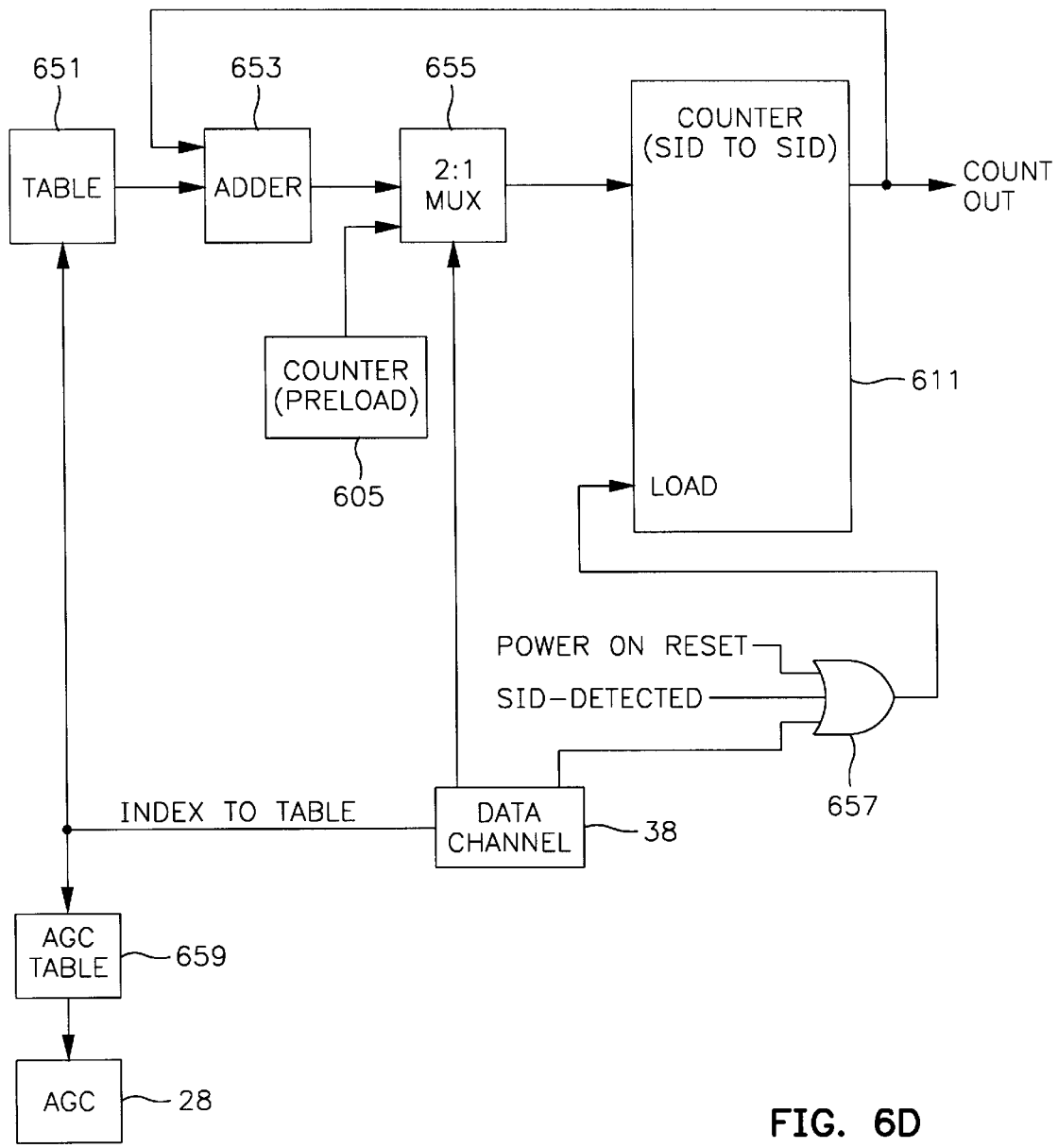
FIG. 6D is an alternative embodiment of the Estimator of the present invention in which initial estimator values are calculated immediately after a head switch has occurred.
Figure 6E:
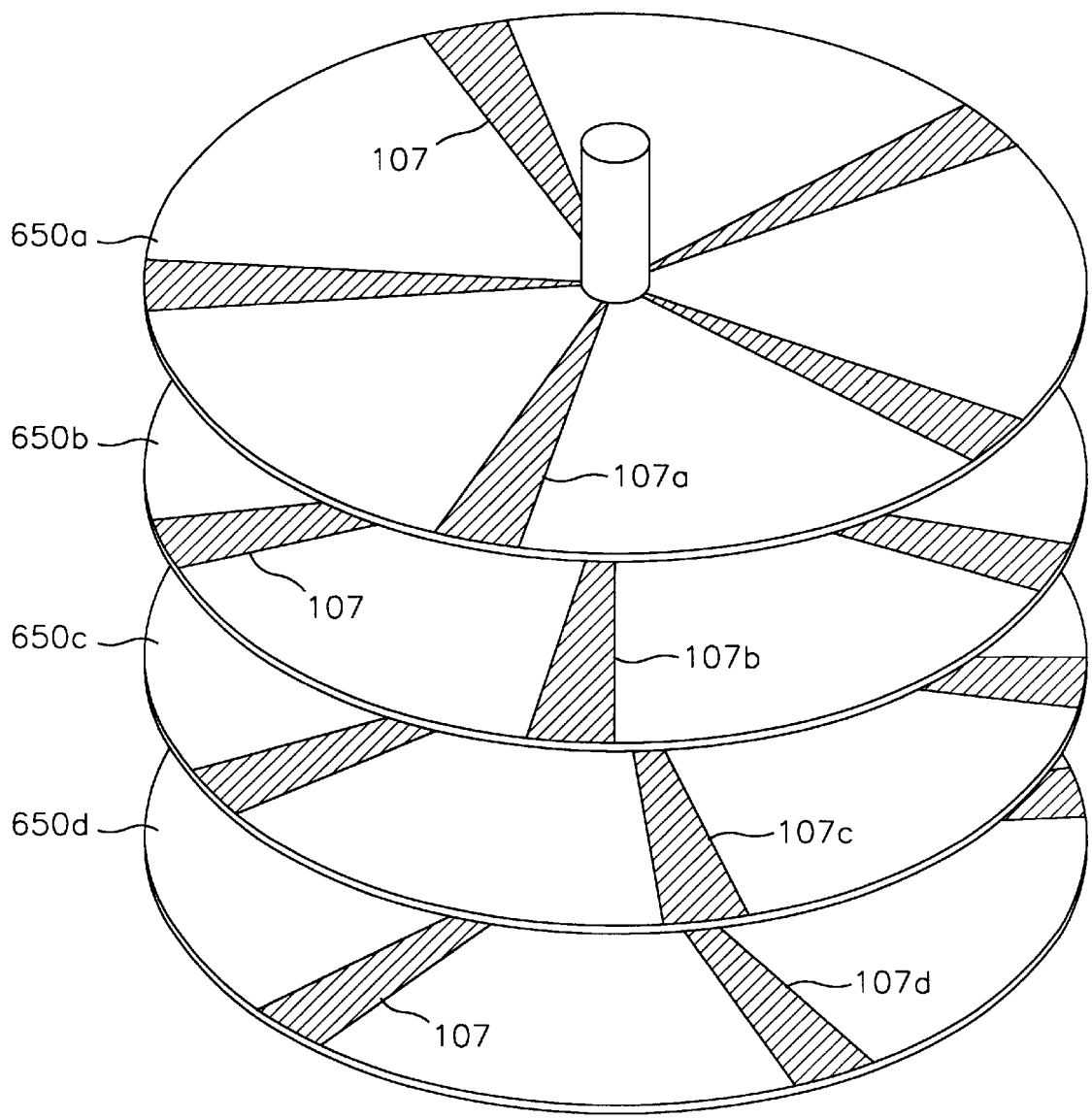
FIG. 6E represents a disk having four platters.

For example, FIG. 6E illustrates a disk drive having four platters 650a–650d (i.e., N=4). Each platter 650 has a number of servo sectors 107. The servo sectors 107 on each platter 650 are offset from the servo sectors 107 of each adjacent platter 650 by one fourth the distance between adjacent servo sectors 107 of one platter. This is illustrated in FIG. 6E which shows that servo sector 107a on platter 650a is offset from the servo sector 107b on platter 650b by one fourth the distance between adjacent servo sectors one the same platter. Similarly, relationships exist between the servo sectors on each of the other platters. If the servo sectors 107 are each evenly staggered, then the count between a first head n and a second head n' is provided by the formula:

$$C' = -\mathrm{mod}\left((A-C)+C_{nn'}.\ \mathrm{mod}\ (n'-n, N), C_{SS}\right)+A \qquad (3)$$

where:

Mod(X,Y) is a function whose value is the remainder when the integer X is divided by the integer Y;

A is the terminal count value;

C is the current value of the System Clock counter 611; and

C' is a new value to be loaded into the System Clock counter 611 to cause the counter 611 to have a value of zero when the next SID is expected.

The System Clock counter 611 can then be used to generate a SID detection window as described above to ensure a pattern, such as a pattern in the gray code of the new platter 650, is not mistaken for a SID pattern in the servo sector 107.

In accordance with an alternative embodiment of the present invention illustrated in FIG. 6D, a table 651 is maintained which stores an offset value to be applied to the System Clock counter 611 to account for a change from a first read/write head to a second read/write head. Accordingly, the value indicates the difference between the time when the first read/write head is expected to detect a next SID and the time when the second read/write head is expected to detect the next SID. Therefore, by adding the stored value to the value in the preload counter 605 and loading it into the counter 611 at the end of the next servo sector after the head switch has occurred, the counter can be adjusted to account for the change from a first to a second read/write head without having to do the modula arithmatic shown in equation 3. As shown in FIG. 6D, the output from the table 651 is applied to a first input to an adder 653. A second input to the adder circuit 653 is coupled to the output from the Preload counter 605. The output from the adder 653 is coupled to a first input to a multiplexer 655. A second input to the multiplexer 655 is coupled to the output from the Preload counter 605. The multiplexer selects either the output from the adder 653 or the output from the Preload counter 605 and couples the selected output to the load input of the System Clock counter 611. The multiplexer selects the output under the control of a signal coupled to the multiplexer 655 from the data channel 38. The data channel 38 causes the multiplexer 655 to select the output from the adder 653 when a change is made from a first to a second read/write head. In addition, the data channel commands the System Clock counter 611 to load the value from the multiplexer 655. As a result, the output value of the preload counter 605 is adjusted by the table value and is loaded into the counter 611. A signal from the data channel is coupled to a three input logical OR gate 657 which substitutes for the two input OR gate 650 shown in FIG. 6C. Once the value of the counter 611 has been modified, the data channel selects the output from the Preload counter 605 to be loaded into the System Clock counter 611 upon detection of the next SID. Alternatively, a gate is provided at the output of the sector pulse comparator 608 of FIG. 6C to prevent sector pulses from being generated until at least one SID has been detected after switching read/write heads. It will be understood by those skilled in the art that other implementations are possible. For example, a subtractor may be used in place of the adder 653. Furthermore, more complex devices, such as programmable devices may be used to adjust the value that is output from the System Clock counter 611 as would be appropriate for the change from a first read/write head to a second read/write head.

Each read/write head will typically have a gain that differs (in some cases substantially) from the other read/write heads within the same DASD. In accordance with one embodiment of the present invention, variations in gain are compensated for by maintaining a table 659 of approximate gain values associated with each read/write head. When the read/write head is changed, a relative gain value associated with the combination of the old head and the new head is preferably used to adjust the gain of the AGC circuit 28 prior to reading the information in any of the AGC fields stored on the medium. Alternatively, the gain of the AGC circuit 28 can be set to a particular level associated with the newly selected read/write head.

Storing a relative gain value associated with each head or pair of heads ensures that the AGC circuit 28 will not be saturated by too high a gain level. In addition, the AGC circuit 28 is ensured that the gain will not be so low as to make detection of the AGC field impossible.

Figure 7:
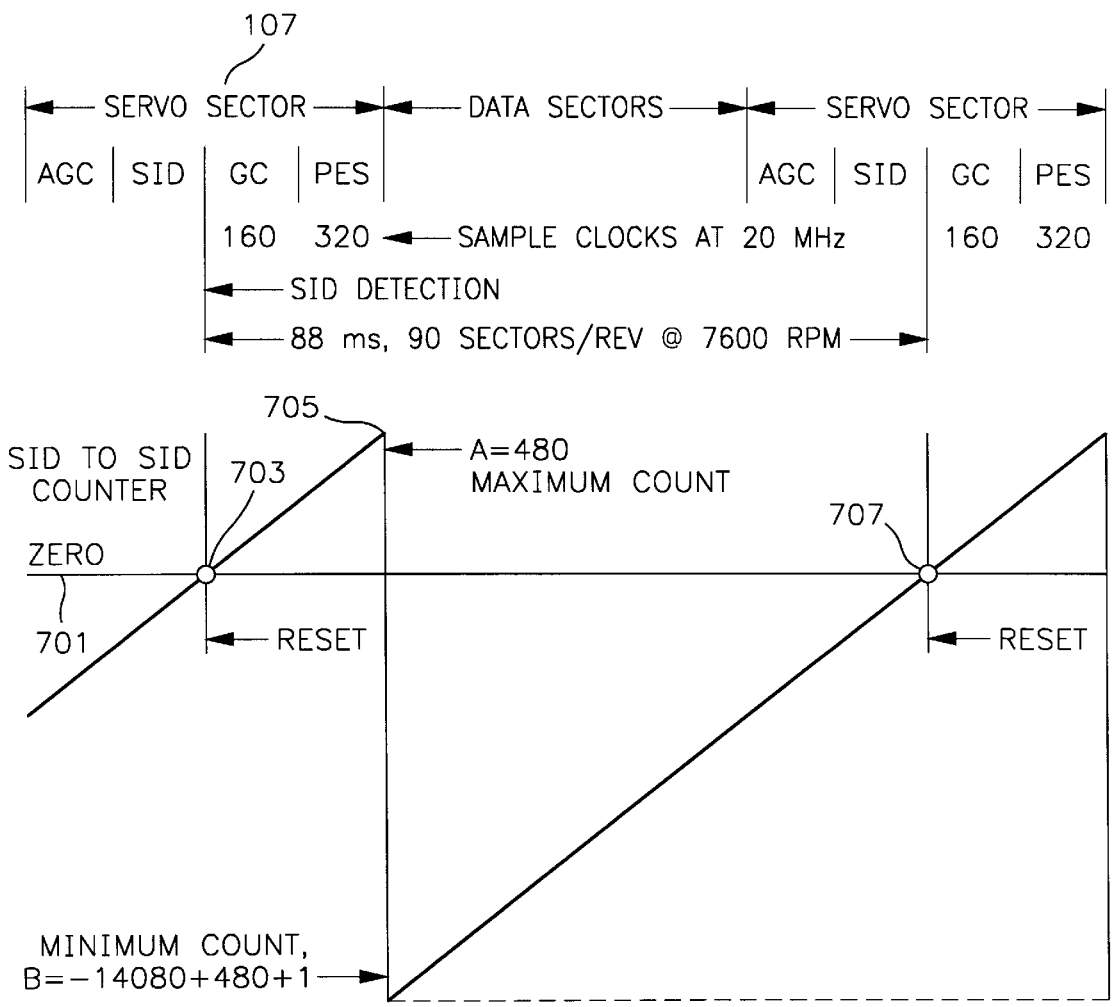
FIG. 7 is an illustration of the value of the System Clock counter versus the location of the read/write head with respect to the servo sector.

FIG. 7 is an illustration of the value of the System Clock counter 611 versus the location of the read/write head with respect to a servo sector 107. Immediately after the detection of a SID, the System Clock counter 611 is reset to a first predetermined value, which is preferably zero (represented by line 701) at point 703. The counter 611 then changes value monotonically in the direction of a terminal value at point 705. In the embodiment represented by FIG. 7, the counter 611 increments upward to a terminal value of 480 at point 705, which occurs coincident with the end of the servo sector 107. The counter 611 is then loaded with a second predetermined value from the Preload counter 605. The second predetermined value is denoted as "B" in FIG. 7. In accordance with one embodiment of the present invention, the value of B is initially equal to −14,080+480+1=−13,599, as explained above. The counter 611 then changes value monotonically (e.g., increments upward) to a point 707, at which point the next SID is detected. If the medium is rotating at exactly the nominal rotational velocity (7600 RPM in accordance with one embodiment), then the counter 611 will be equal to the first predetermined value (e.g., zero, as shown in FIG. 7) at point 707. The counter 611 then continues to change value monotonically (e.g., is incremented) in the same manner as occurs between point 703 and point 705.

If the medium is rotating faster than the nominal rotational velocity, then the counter value of the System Clock counter 611 at point 707 will be less than the first predetermined value (e.g., a negative number if the first predetermined value is zero). The difference between the counter value at point 707 and the first predetermined value is proportional to the ratio of the nominal rotational velocity of the medium with respect to the actual rotational velocity of the medium. In the case shown in FIG. 7, the faster the medium is rotating, the more negative the counter value will be when the next SID is detected. Inversely, the slower the medium is rotating, the more positive the counter value when the next SID is detected.

Figure 8:
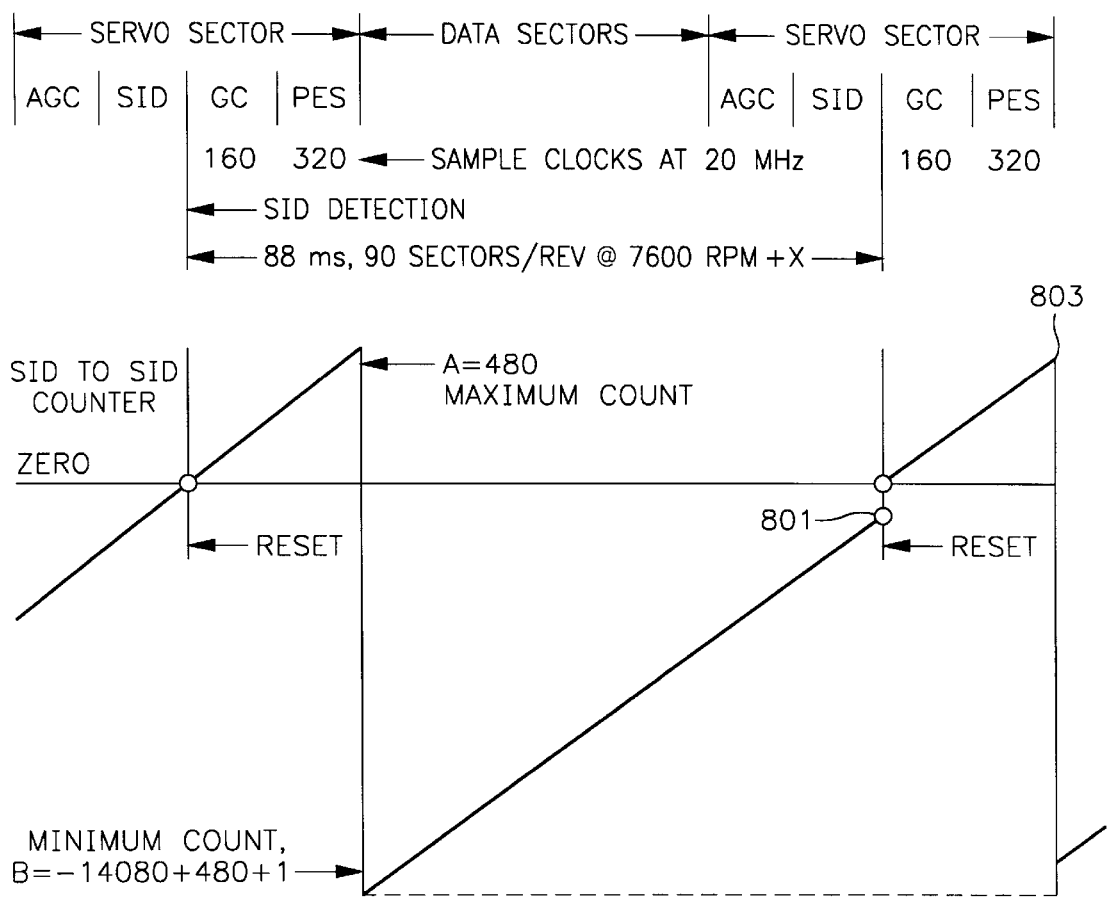
FIG. 8 illustrates the counter value versus the location of the read/write head for the case in which the medium is rotating faster than the nominal rotational velocity.

FIG. 8 illustrates the counter value versus the location of the read/write head for the case in which the first predetermined value is zero, the terminal value is equal to 480, the second predetermined value is equal to −13,599, and the medium is rotating faster than the nominal rotational velocity (i.e., 7600+X, where X is a positive value). As shown in FIG. 8, the counter 611 is reset at the point 801 after detection of the SID. The negative value of the counter 611 at point 801 causes the value stored in the Preload counter 605 to be incremented by an amount equal to the difference between the actual counter value and the expected counter value (zero) in terms of cycles of the System Clock 609. In accordance with the preferred embodiment, the value stored in the Preload counter is incremented (i.e., made less negative). Preferably, the value is incremented by one count. However, in an alternative embodiment, the value is incremented by another value, such as the amount of the error. The counter 611 is then incremented normally to the point 803 at which the terminal count value is reached. At that point 803, the counter is loaded with the value from the Preload counter 605. Assuming that the rotational velocity of the medium remains the same, the counter 611 will have a value of zero when the next SID is detected. If rotational velocity does change, then the value of B will be readjusted in response.

Figure 9:
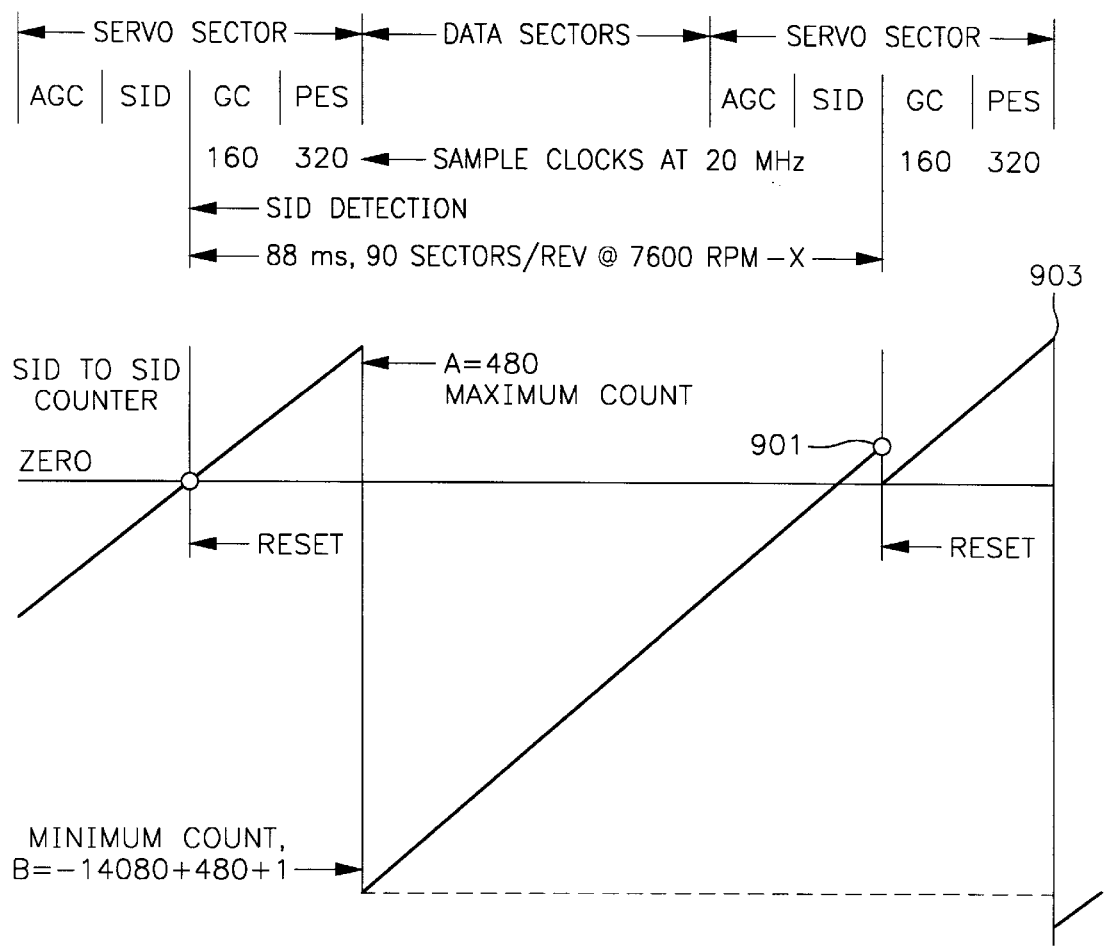
FIG. 9 is an illustration of the counter value of the counter versus the location of the read/write head for the case in which the medium is rotating slower than the nominal rotational velocity.

FIG. 9 is an illustration of the value of the counter 611 versus the location of the read/write head for the case in which the medium is rotating slower than the nominal rotational velocity. As shown in FIG. 9, the counter value passes zero and continues upward until the SID is detected. At that point 901, the counter 611 is reset to zero. Concurrently, the value stored in the Preload counter 605 is changed by an amount equal to the difference between the expected value (zero) and the actual value in terms of System Clock 609 cycles. In accordance with the preferred embodiment, the value stored in the Preload counter is decremented (i.e., made more negative). Preferably, the value is decremented by one count. However, in an alternative embodiment, the value is decremented by another value, such as the amount of the error. The counter 611 begins to increment normally up from zero at point 901 to the terminal count value at point 903. When the terminal count value is reached, the counter 611 is again loaded with the value from the Preload counter 605.

It will be seen that by adjusting the value of the Preload counter 605 and loading that adjusted value into the counter 611 when the terminal count value is reached, the amount of time estimated between detection of two adjacent SIDs is corrected. Therefore, the estimate of the time at which the next SID will be detected more accurately tracks the actual time that the next SID is detected.

It should be noted that since the correction is made by changing the value that is loaded into the counter 611, the point at which the each data cell is determined to begin is shifted an equal amount for each of the data cells that follow. That is, the read and write gates are synchronized to counter 611. Accordingly, the present invention provides a relatively accurate estimate of the time at which the SID can be expected to be detected. However, the amount time which elapses between detection of the SID and each data cell must also be adjusted since the counter value that is loaded into the counter 611 in FIG. 9 is less than the counter value that is loaded when the medium is rotating at the nominal value. This is achieved by changing the counter value at which the read and write gates are generated. Therefore, in accordance with one embodiment of the present invention, the correction to the value at which each read and write gate should begin is made according to the following equation:

$$D'=D*(B+A)/(B_{nom}+A) \qquad (4)$$

where:

A is the terminal count value, $B_{nom}$ is the value stored in the Preload counter when the medium is rotating at the nominal rotational velocity;

B is the value currently stored in the Preload counter;

D is the counter value at which the read or write gate would be generated were the medium rotating at the nominal rotational velocity; and D' is the corrected counter value at which the read or write gate will be generated when the medium is moving at the current rotational velocity For example, if, when the medium is rotating at the nominal rotational velocity, a sector pulse is to be generated when the counter value is equal to −10,050, and the value stored within the Preload counter is equal to −13,608, then the corrected counter value D' at which the sector pulse is generated is:

$$-10,056=-10,050* (-13,608-480)/(-13,600-480) \qquad (5)$$

Therefore, the sector pulse is generated at the counter value 10,056 rather than at the counter value 10,050, as would be the case if the medium were rotating at the nominal rotational velocity.

A digital signal processor is preferably used to perform the multiplication. However, division poses a problem in most digital computers. Therefore, in accordance with one embodiment of the present invention, the System Clock 609 is set to operate at a rate that will cause the denominator of equation (5) to be a power of 2. Making the denominator a power of 2 allows the division to be done by simply truncating the value of the numerator. For example, in accordance with one embodiment of the present invention, the System Clock rate is equal to 16,384 cycles (i.e., $2^{14}$ cycles) per SID-to-SID period. In such an embodiment, the terminal count value is 558, rather than 480. Therefore, applying formula (1) results in $B_{nom}$ being equal to −16,384+558+1=−15825.

It should be noted that other methods may be used to adjust the value of the count at which the servo pulses are to be generated. For example, the difference between B and $B_{nom}$ can be subtracted from the value of the counter 611 just after it has been loaded. At eight different points evenly spaced over the SID-to-SID period, an additional eighth of the difference could be added back to the value of the counter 611. Accordingly, in the example described above in which B is equal to 13,600, the difference of 8 is initially subtracted from the value of the counter 611. When the counter reaches 13,600/8=1,700, the value 8/8=1 (i.e., one eighth of the difference between B and $B_{nom}$) is added to the value of the counter 611. This is done at regular intervals of 1,700. Thus, at 3,400, the value 8/8 is again added to the value of the counter 611. When the counter 611 reaches the value 11,901, the entire correction value of 8 will have been added back to the value of the counter 611. In this way the correction factor is added in a manner which distributes the correction relatively evenly over the length of the SID-to-SID period.

In accordance with an alternative embodiment, data cells are made bigger (i.e., have more tolerance in the data sector format, such as by providing larger pads) in proportion to the distance of the data sector from the next SID, so that readjustment of the data cell timing is not necessary.

It has been noted that, in accordance with the preferred embodiment of the present invention, the inertia of the medium is such that the velocity of the medium will not change by more than one count within approximately 16,000 in the time the medium rotates the distance between two adjacent sectors. Therefore, changes are made to the value B stored in the Preload counter at a preferred maximum rate of one count per SID-to-SID period. That is, in accordance with the preferred embodiment, each time a SID is detected, the SEC 601 determines whether the counter value of the System Clock counter 611 is positive, negative, or zero. If the value is positive, the SEC 601 sends a signal to the System Clock counter 611 to decrement (make more negative by one) the value in the Preload counter 605. If the value is negative, the SEC 601 sends a signal to the System Clock counter 611 to increment (make more positive by one) the value in the Preload counter 605.

In accordance with one embodiment of the present invention in which the rotational velocity is held constant within a tolerance of 0.1%, the System Clock counter value cannot vary by more than 14 counts from the nominal value once the medium is rotating at a stable operating velocity. Accordingly, if the rotational velocity of the medium is equal to the nominal velocity ±0.1%, the System Clock counter value will reach zero within no more than 14 sectors. Once the clock counter value reaches zero, the rate of acceleration or deceleration of the medium will be sufficiently slow that the System Clock counter 611 can track the rotational velocity of the medium to within ±1 of the value loaded from the preload counter 605 when the next SID is detected (assuming that the SID is detected with the next servo sector).

In accordance with one embodiment of the present invention, the SEC 601 only outputs a sector pulse when the value of the System Clock counter 611 is within a predetermined window of values about zero when a SID pulse is detected. Otherwise, generation of the sector pulses will be inhibited for the SID-to-SID period that follows. The sector pulse is used by the data channel to determine when to generate a write gate and a read gate. Alternatively, a servo pulse will be generated when the value of the System Clock counter 611 is less than some predetermined value which may be greater than one, but is preferably below a value determined to cause a read or write error.

By inhibiting the generation of a sector pulse, generation of the read and write gates is inhibited. Accordingly, the present invention prevents data from being read or written when the rotational velocity is not being properly tracked by the SEC 601. A failure of the SEC 601 to properly track the rotational velocity of the medium can be attributed, for example, to an external force (such as a shock applied to the DASD) which causes the rotational velocity of the medium relative to that of the head to change at a rate that is too great for the spindle motor to correct immediately, or due to a partial failure of the spindle driver or spindle motor. In any case, if the read and write gates are not inhibited, errors will occur in reading and writing operations. Of particular concern is the fact that data may be lost. For example, in an attempt to write data into a first data cell, data in an adjacent cell may be unintentionally overwritten because a timing error has occurred. In particular, since the lengths of the pads and the AGC fields of the preferred embodiment are reduced, the tolerance must be maintained closely to prevent overwriting a portion of an adjacent cell.

In accordance with one embodiment of the present invention, Pseudo SID pulses may be output from the SEC 601 each time the counter value from the System Clock counter 611 reaches zero. Accordingly, even if a servo sector passes without detection of the associated SID, the SEC 601 will generate a sector pulse which is used by the data channel to generate the read and write gates. Furthermore, the read and write gates will have an error of no more than 1 count by the end of the sector under normal conditions (assuming that the inertia of the medium will restrict the amount of change in the velocity of the medium to 1 count).

It can be seen that by more accurately determining when a SID is to arrive under the read/write head, the beginning of each data cell can be more accurately determined. Thus, the lengths of the pad 301 at the beginning of a data field, the pad 303 at the end, and the AGC field 305 can be reduced (see FIG. 3). This reduction increases the efficiency of the medium (i.e., the ratio of digits that can be used to represent user data with respect to the number of digits required for overhead). For example, the present invention can reduce the uncertainty as to where the beginning of a data cell is located to within ±1 byte, thereby allowing the length of the pads 301, 303 to be reduced to 2 bytes each. Furthermore, this reduction in uncertainty means that the AGC field 305 can be reduced from 30 bytes to 14 bytes. Therefore, in a data cell having 585 bytes and the format shown in FIG. 3, assuming a DASD having a spindle tolerance of ±0.1%, the present invention can save 24 bytes.

Accordingly, the present invention can provide a 24/585*100=4.10% smaller data cell which carries the same amount of user data resulting in greater overall disk capacity.

Figure 1:
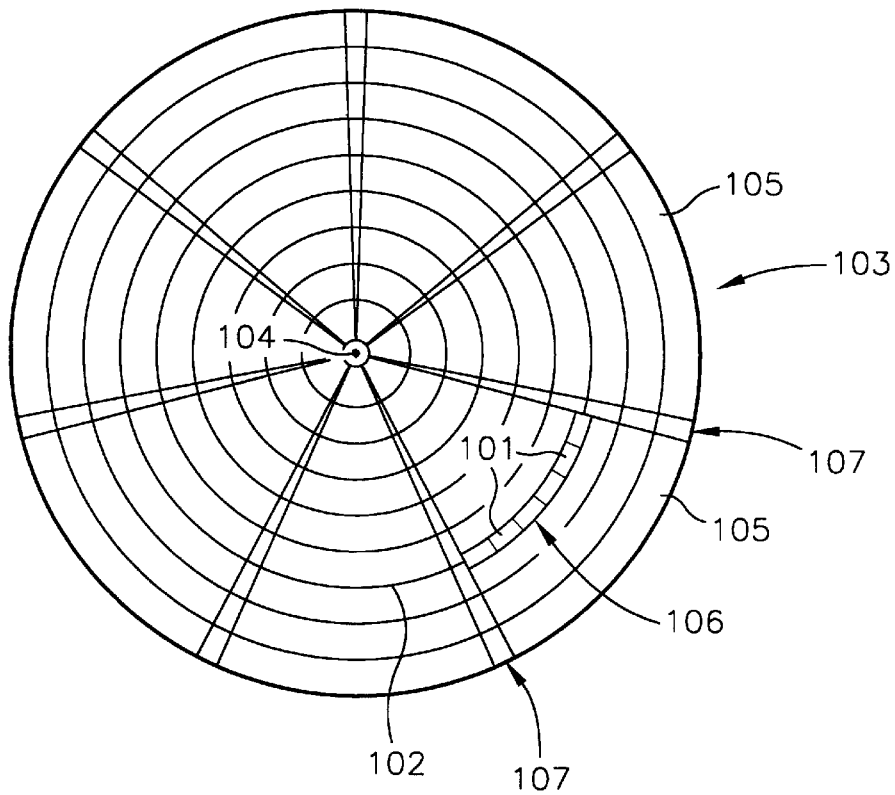
FIG. 1 is an illustration of the manner in which data is organized on a medium in accordance with an embedded servo disk drive.
Figure 2:
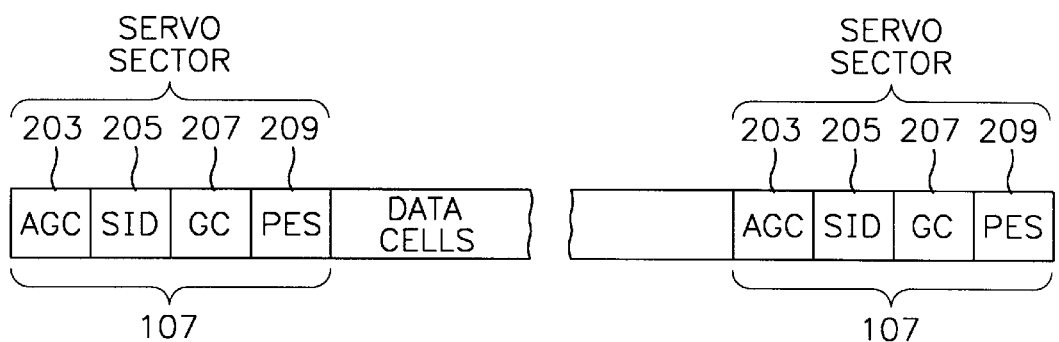
FIG. 2 is an illustration of the organization of data within a servo sector of a DASD using a PRML-type data channel.
Figure 5:
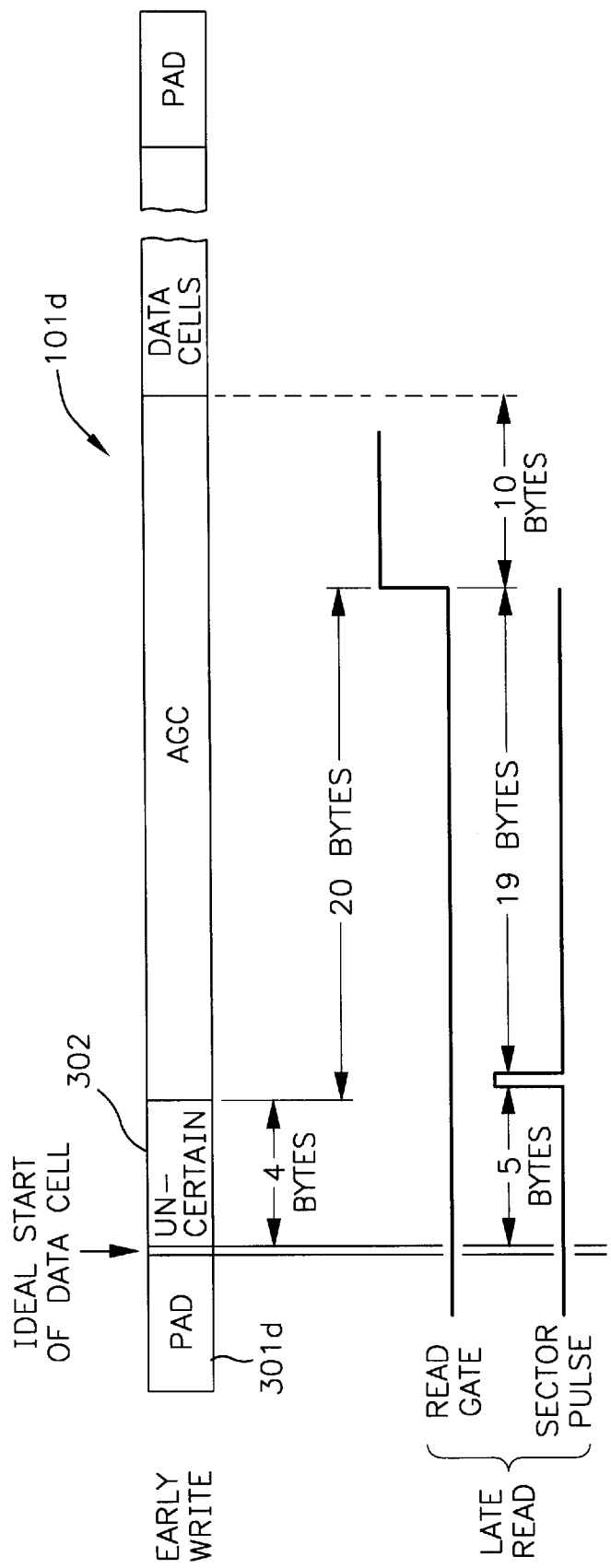
FIG. 5 is an illustration of the relationship between a data cell that was written early and subsequently read with a late sector pulse.
Figure 10:
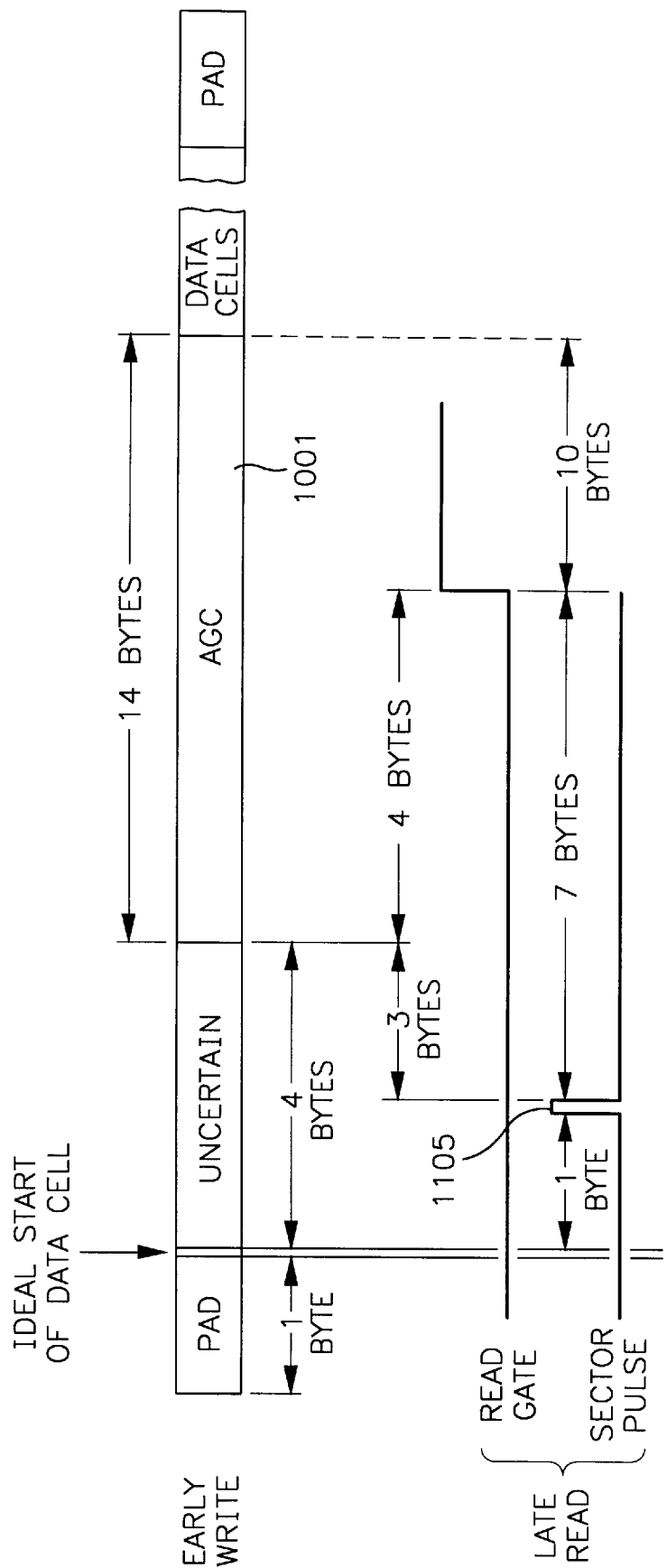
FIGS. 10 and 11 illustrate how the present invention reduces the length of the data cell by approximately 4.10%.
Figure 11:
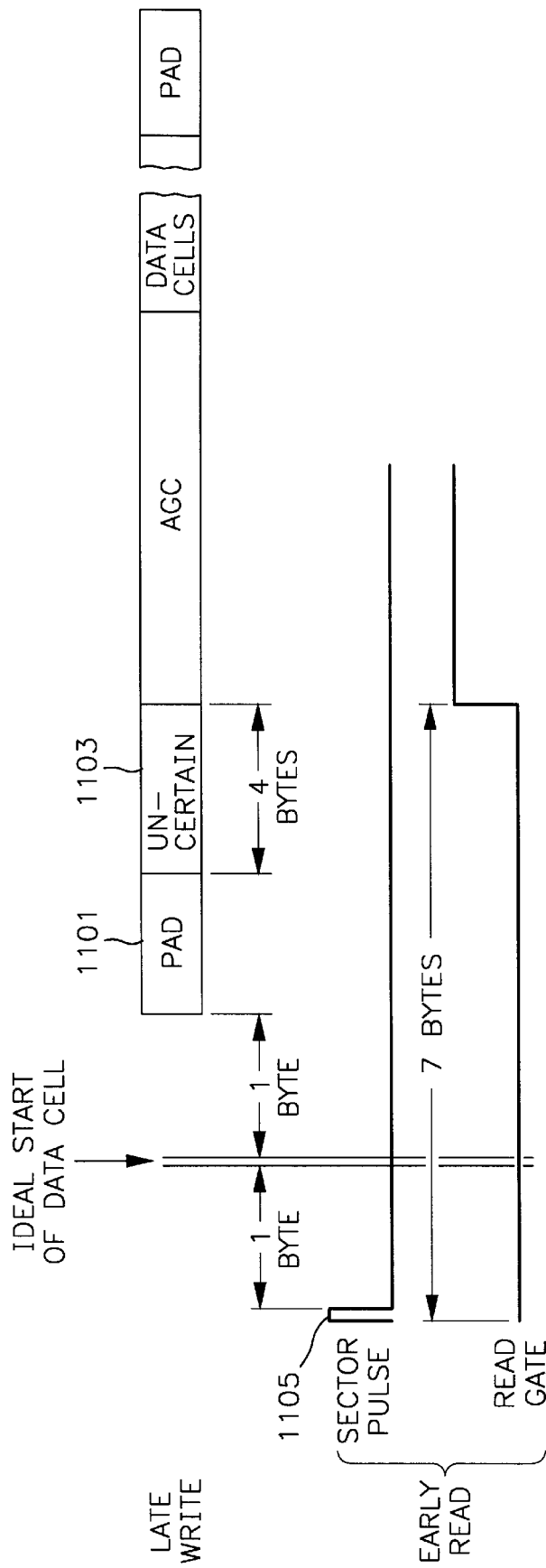

FIGS. 10 and 11 illustrate how the present invention reduces the length of the data cell by approximately 4.10%. As shown in FIG. 11, when the write occurs late, the data cell begins one byte-time late. In a subsequent read of that data cell, the read gate will be raised early relative to the data. To correct for this, the read gate according to the present invention is raised 7 byte times after detection of the sector pulse 1105: two bytes to ensure that the data cell has begun, an additional byte for the leading pad 1101, and an additional 4 bytes for the uncertain data field 1103 before a valid AGC byte can be assured. FIG. 10 shows that if the sector pulse 1105 in a read operation occurs late relative to the data written, the read gate activates after only four bytes of the AGC have been wasted. Therefore, in order to ensure that in the worst case (shown in FIG. 10) the read/write head will be over the AGC field 1001 for at least 10 valid AGC bytes, the AGC field need only be 14 bytes long. This is in contrast to the case illustrated in FIGS. 4 and 5 in which the AGC field must be at least 30 bytes long to ensure at least 10 bytes of AGC information.

In addition to reducing the amount of data cell overhead, the present invention can also be used to provide greater feedback to the spindle drive motor. That is, by providing the difference between $B_{nom}$ and B to the spindle driver, errors in the rotational velocity of the medium can be corrected each time the servo decoder detects a servo sector. The increase or decrease in the speed of the spindle motor can be made proportional to the difference between $B_{nom}$ and B.

While the particular system and method for SID-to-SID period estimation as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A method for anticipating when a servo identification pattern (SID) should be read in a storage device having a moveable storage medium formatted into a plurality of sectors, each sector including a servo identification pattern the method including the steps of:

counting an elapse of time from detection of a first of the servo identification patterns to detection of a next of the patterns;

comparing the counted elapse of time to a first value;

if the counted elapse of time is greater than the first value, then increasing the first value by a preselected amount;

if the counted elapse of time is less than the first value, then decreasing the first value; and using the first value to anticipate when the next servo identification pattern should be detected, wherein each servo identification pattern is a field in a servo sector, and wherein data is stored between the servo sectors and wherein the step of counting the elapse of time includes the steps of:

beginning the count at zero;

incrementing the count to a terminal value representing a first expected elapse of time from detection of the SID to the end of its servo sector;

making the count equal to a third value representing a second expected elapse of time from the end of the servo sector until the detection of the next SID; and upon reaching the terminal value, continuing to increment the count from the third value until the second servo identification pattern is detected.

2. The method of claim 1, further including the step of generating sector pulses when the counted elapse of time is within a selected range of values.

3. The method of claim 1, wherein the storage medium further comprises data stored between the first and second sector ID patterns, and further including the step of generating a read gate if the difference between the first value and the counted of time is less than an second value.

4. The method of claim 3, further including the step of inhibiting the read gate if the difference between the first value and the counted elapse of time counted is not less than the second value.

5. The method of claim 1, wherein the elapse of time is measured by counting a number of clock cycles that occur starting upon detection of a first of the servo identification patterns and ending upon detection of a next of the patterns.

6. The method of claim 5, wherein the clock cycles occur at a frequency that causes the nominal number of clock cycles between servo identification patterns in two consecutive sectors to be a power of two.

7. The method of claim 1, further including the step of generating a write gate if the difference between the first value and the counted elapse of time is less than a second value.

8. The method of claim 7, further including the step of inhibiting the write gate if the difference between the first value and the counted elapse of time is not less than the second value.

9. The method of claim 1, further including the step of adjusting the selected range upon changing the value of the first value.

10. The method of claim 1, further including the step of adjusting the counted elapse of time when the medium from which the servo identification patterns are read changes from a first to a second medium surface.

11. The method of claim 10, wherein the amount of the adjustment depends upon the relative location of the servo identification patterns the first medium surface with respect to the second medium surface.

12. The method of claim 1, wherein counting the elapse of time further comprises the steps of:
making the count equal to zero when the second servo identification pattern is detected if the second servo identification pattern is detected before the count reaches the terminal count again; and
adjusting the count to the predetermined value again and continuing to increment the count until the second servo identification pattern is detected if the count reaches the terminal count again before the servo identification pattern is detected.

13. The method of claim 12, wherein the counted elapse of time is equal to the terminal value minus the third value plus the count value when the second servo identification pattern is detected.

14. The method of claim 13, wherein the first value represents an expected elapse of time between detection of the first and second SID when a rotating medium on which the SIDs are stored is rotating at a nominal rotational velocity.

15. The method of claim 1, further including the steps of:
increasing the rotational velocity of a rotating medium on which the servo identification patterns are stored if the elapsed time counted between the detection of the first and second servo identification pattern is greater than the first value; and
decreasing the rotational velocity of the rotating medium if the elapse of time counted between detection of the first and second servo identification patterns is less than the first value.

16. A system for anticipating when a servo identification pattern should be read within a direct access storage device having a movable storage medium formatted into sectors, each sector including a servo identification pattern, the system including:
a. a system clock;
b. a system clock counter, coupled to the system clock for counting the number of cycles of the system clock starting at a first point in time, and ending at a second point in time;
c. a controller, coupled to the system clock counter, for:
 i. establishing as the first point in time, the time at which a first servo identification pattern is detected;
 ii. establishing as the second point in time, the time at which a second servo identification pattern is detected;
 iii. receiving from the system clock counter a count value representing the number of clock cycles that have occurred since the first point in time;
 iv. comparing the received count value at the second point in time with a first value representing the number of cycles that occurred between the first point in time and the second point in time when the medium is rotating at a nominal rotational velocity;
 v. adjusting the first value if the received count value differs from the first value;
 vi. generating a sector pulse when the count value is equal to selected values, the selected values being dependent upon the value of the adjusted first value, wherein the system clock cycles at a frequency that causes the nominal number of counts between servo identification patterns in two consecutive sectors to be a power of two.

17. The system of claim 16, wherein the controller is further for generating a read gate if the difference between the first value and the received count value is less than a second value.

18. The system of claim 17, wherein the controller is further for inhibiting the read gate if the difference between the first value and the received count value is not less than the second value.

19. The system of claim 16, wherein the controller is further for generating a write gate if the difference between the first value and the received counted value is less than a second value.

20. The system of claim 19, wherein the controller is further for inhibiting the write gate if the difference between the first value and the received count value is not less than the second value.

21. The system of claim 16, wherein the controller is further for adjusting the count value when the medium from which the servo identification patterns are read changes from a first to a second medium.

22. The system of claim 21, wherein the amount of the adjustment depends upon the relative location of the servo identification patterns the first medium with respect to the second medium.

23. A program storage device readable by a digital processing apparatus and tangibly embodying a program of instructions executable by the digital processing apparatus to perform method steps for anticipating when a servo identification pattern should be read, the method steps comprising:
a. monotonically changing a count value from an initial value toward a terminal value upon each cycle of a clock, beginning upon detection of a first servo identification pattern;
b. making the count equal to a second value upon the count reaching the terminal value;
c. monotonically changing the count value from the second value toward the terminal value upon each cycle of the clock until either the second servo identification pattern is detected or the terminal value is again reached;

d. if the second servo identification pattern is detected before the count reaches the terminal value, then:
   i. comparing the count at the time the second servo identification pattern is detected with the initial value,
   ii. changing the second value by a preselected amount in order to reduce the difference between the second value and the initial value by the preselected amount;
   iii. making the count equal to the initial value; and
   iv. monotonically changing the count value toward the terminal value from the initial value upon each cycle of the clock;

e. if the second servo identification pattern is not detected before the terminal count is exceeded, then making the count equal to the second value and continuing to monotonically change the count value toward the terminal value upon each cycle of the clock; and f. generating a sector pulse each time the count value is within a selected range of values.

24. The program storage device of claim 23, wherein the preselected amount by which the second value is changed is one.

25. The program storage device of claim 23, further including the method steps of generating a read gate if the difference between the second number and the count is less than a fifth predetermined number upon detection of the second servo identification pattern.

26. The program storage device of claim 25, further including the step of inhibiting the read gate if the difference between the second number and the count is not less than the fifth number.

27. The program storage device of claim 23, further including the step of generating a write gate if the difference between the second number and the count is less than a fifth number.

28. The program storage device of claim 27, further including the step of inhibiting the write gate if the difference between the second number and the count is not less than the fifth number.

29. The program storage device of claim 23, further including the step of adjusting the count value when the medium surface from which the servo identification patterns are read changes from a first to a second medium surface.

30. The program storage device of claim 29, wherein the amount of the adjustment depends upon the relative location of the servo identification patterns on the first medium with respect to the second medium.

31. The program device of claim 23, wherein the clock cycles at a frequency that causes the nominal number of cycles counted between servo identification patterns is a power of two.

32. The program storage device of claim 23, wherein the initial value is zero.

33. The program storage device claim 23, wherein the servo identification patterns are stored in servo sectors on a rotating medium, and the count value is equal to the terminal value at the end of a servo sector if the medium is rotating at a nominal rotational velocity.

34. The program storage device of claim 23, wherein the servo identification patterns are stored on a rotating medium, and the sum of the absolute value of the terminal value and the second value is equal to the number of clock cycles that occur between detection of the first servo identification pattern and detection of the second servo identification pattern if the medium is rotating at the nominal rotational velocity.

35. The program storage device of claim 23, wherein the servo identification patterns are stored on a rotating medium, and further including the steps of:
    decreasing the rotational velocity of the medium if the second servo identification pattern is detected before the count reaches the first value; and
    otherwise, increasing the rotational velocity of the medium if the second servo identification pattern is detected before the count reaches the terminal value.

36. A method for anticipating when a servo identification pattern (SID) should be read, including the steps of:
    counting the number cycles of a clock beginning upon detection of a first servo identification pattern, and ending upon detection of a second servo identification pattern;
    comparing to a first number, the number of cycles counted between detection of the first and second SIDs;
    if the number of cycles counted between the time the first servo identification pattern is detected and the time the second servo identification pattern is detected is greater than the first predetermined number, then increasing the value of the first predetermined number;
    if the number of cycles counted between the time the first servo identification pattern is detected and the time the second servo identification pattern is detected is less than the first predetermined number, then decreasing the value of the first predetermined number; and
    generating sector pulses when the number of cycles counted is within a selected range of values, wherein:
    the count in initialized to zero;
    the count increments to a terminal value;
    the count is made equal to a predetermined value that is less than zero each time the count reaches the terminal value, and continues to increment from the predetermined value until a next servo identification pattern is detected or the count equals the terminal value again;
    the count is set to zero each time a servo identification pattern is detected the after count reaches the terminal count for a first time and after the terminal count is reached for a second time;
    the number of cycles counted between the time the first servo identification pattern is detected and the time a second servo identification pattern is detected is increased by decreasing the predetermined value, and the number of cycles counted between the time the first servo identification pattern is detected and the time a second servo identification pattern is detected is decreased by increasing the predetermined value; and
    the sum of the terminal value and the absolute value of the predetermined value is equal to one less than the number of cycles that will occur between the time the first servo identification pattern is detected and the time the second servo identification pattern is detected when the medium is rotating at a nominal rotational velocity.

37. The method of claim 36, further including the step of generating a read gate if the difference between the first predetermined number and the number of clock cycles counted is less than a second predetermined number.

38. The method of claim 37, further including the step of inhibiting the read gate if the difference between the first predetermined number and the number of clock cycles counted is not less than the second predetermined number.

39. The method of claim 36, further including the step of generating a write gate if the difference between the first predetermined number and the number of clock cycles counted is less than a second predetermined number.

40. The method of claim 39, further including the step of inhibiting the write gate if the difference between the first predetermined number and the number of clock cycles counted is not less than the second predetermined number.

41. The method of claim 36, wherein the clock cycles at a frequency that causes the nominal number of clock cycles counted between consecutive servo identification patterns is a power of two.

42. The method of claim 36, further including the step of adjusting the count value when the medium from which the servo identification patterns are read changes from a first to a second medium.

43. The method of claim 42, wherein the amount of the adjustment depends upon the relative location of the servo identification patterns the first medium with respect to the second medium.

44. The method of claim 36, further including the steps of:
adjusting the selected values as a function of the changes in the value of the predetermined number.

45. A system for anticipating when a servo identification pattern should be read within a direct access storage device having a rotating medium on which servo identification patterns are stored, the system including:
 a. a system clock;
 b. a system clock counter, coupled to the system clock for counting the number of cycles of the system clock starting at a first point in time, and ending at a second point in time;
 c. a controller, coupled to the system clock counter, for:
  i. establishing as the first point in time, the time at which a first servo identification pattern is detected;
  ii. establishing as the second point in time, the time at which a second servo identification pattern is detected;
  iii. receiving from the system clock counter a count value representing the number of clock cycles that have occurred since the first point in time;
  iv. comparing the received count value at the second point in time with a first predetermined value representing the number of cycles that occurred between the first point in time and the second point in time when the medium is rotating at a nominal rotational velocity;
  v. adjusting the first predetermined value if the count value received at the second point in time differs from the predetermined count value;
  vi. generating a sector pulse when the count value is equal to selected values, the selected values being dependent upon the value of the adjusted first predetermined value.

46. The system of claim 45, further including the step of generating a read gate if the difference between the first predetermined value and the received count value is less than a second predetermined value.

47. The system of claim 46, further including the step of inhibiting the read gate if the difference between the first predetermined value and the received count value is not less than the second predetermined value.

48. The system of claim 45, further including the step of generating a write gate if the difference between the first predetermined value and the received counted value is less than a second predetermined value.

49. The system of claim 48, further including the step of inhibiting the write gate if the difference between the first predetermined value and the received count value is not less than the second predetermined value.

50. The system of claim 45, wherein the system clock cycles at a frequency that causes the nominal number of clock cycles between consecutive servo identification patterns to be a power of two.

51. The system of claim 45, wherein the controller is further for adjusting the count value when the medium from which the servo identification patterns are read changes from a first to a second medium.

52. The system of claim 51, wherein the amount of the adjustment depends upon the relative location of the servo identification patterns the first medium with respect to the second medium.

* * * * *